(12) United States Patent
Shishido et al.

(10) Patent No.: US 7,775,719 B2
(45) Date of Patent: Aug. 17, 2010

(54) BEARING UNIT AND ROTARY DRIVE USING THE SAME

(75) Inventors: Yuji Shishido, Kanagawa (JP); Kenichiro Yazawa, Tokyo (JP); Takeshi Kaneko, Chiba (JP); Kiyoyuki Takada, Chiba (JP); Hiroshi Sato, Chiba (JP); Yoshiaki Kakinuma, Tokyo (JP); Ichiro Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 11/584,606

(22) Filed: Oct. 23, 2006

(65) Prior Publication Data

US 2007/0037652 A1 Feb. 15, 2007

Related U.S. Application Data

(62) Division of application No. 10/506,433, filed on Apr. 4, 2005, now Pat. No. 7,455,456.

(51) Int. Cl.
*F16C 32/06* (2006.01)
*H02K 7/08* (2006.01)
(52) U.S. Cl. .................. 384/100; 384/107; 384/123; 384/130
(58) Field of Classification Search .......... 384/100, 384/107, 112–115, 118, 125, 132–133, 279–280, 384/295, 300; 310/67 R, 90, 90.5, 91, 99.8, 310/324, 430
See application file for complete search history.

(56) References Cited

U.S. PATENT DOCUMENTS 4,093,323 A * 6/1978 Quandt et al. ............... 384/220
4,737,673 A * 4/1988 Wrobel ....................... 310/90
4,938,611 A * 7/1990 Nii et al. ..................... 384/133
5,363,003 A * 11/1994 Harada et al. ............. 310/67 R (Continued)

FOREIGN PATENT DOCUMENTS

DE 19859047 A1 * 7/1999

(Continued)

OTHER PUBLICATIONS

International Search Report dated Apr. 20, 2004.

(Continued)

*Primary Examiner*—Marcus Charles
(74) *Attorney, Agent, or Firm*—Rader, Fishman & Grauer PLLC

(57) ABSTRACT

A bearing unit (90) for rotatably supporting a shaft (100) comprises a seamless holding member (120) with a gap allowing a shaft to run through and extend to the outside, a bearing (130) arranged in the inside of the holding member to rotatably support the shaft so as to make it radially revolvable, an anti-shaft-release member (115) fitted to the shaft so as to abut the bearing in order to prevent the shaft from slipping away in the thrusting direction and a space-forming member (113) arranged in the inside of the holding member so as to secure a space around the anti-shaft-release member. A bearing unit may further comprise an lubricating oil seal member and the space-forming member may be used to form a passage way for lubricating oil to prevent lubricating oil from leaking.

17 Claims, 28 Drawing Sheets

U.S. PATENT DOCUMENTS

| | | | |
|---|---|---|---|
| 5,417,507 A * | 5/1995 | Uno et al. .................... | 384/107 |
| 5,423,612 A | 6/1995 | Zang et al. | |
| 5,516,212 A * | 5/1996 | Titcomb ..................... | 384/107 |
| 5,778,948 A * | 7/1998 | Gomyo et al. ............... | 384/133 |
| 5,885,005 A * | 3/1999 | Nakano et al. ............... | 384/113 |
| 6,247,848 B1 * | 6/2001 | Iwaki et al. .................. | 384/107 |
| 6,276,833 B1 * | 8/2001 | Chen .......................... | 384/226 |
| 6,356,408 B1 * | 3/2002 | Nii et al. .................... | 360/99.08 |
| 6,361,214 B1 * | 3/2002 | Ichiyama .................... | 384/107 |
| 6,574,186 B2 * | 6/2003 | Nii et al. ..................... | 310/90 |
| 6,692,152 B2 * | 2/2004 | Shingai et al. ............... | 384/132 |
| 6,756,715 B2 * | 6/2004 | Hirose et al. ................. | 310/90 |
| 6,822,358 B2 * | 11/2004 | Nozaki et al. ................ | 310/90 |
| 6,843,602 B2 * | 1/2005 | Koseki et al. ................ | 384/100 |
| 7,005,768 B2 * | 2/2006 | Tamaoka et al. ............. | 310/90 |
| 2002/0051588 A1 * | 5/2002 | Koseki et al. ............... | 384/100 |
| 2003/0091249 A1 * | 5/2003 | Kurimura et al. ........... | 384/100 |
| 2003/0102742 A1 * | 6/2003 | Nozaki et al. ................ | 310/90 |
| 2004/0000825 A1 * | 1/2004 | Hirose et al. ................. | 310/90 |

FOREIGN PATENT DOCUMENTS

| | | | |
|---|---|---|---|
| JP | 54-117444 | | 8/1979 |
| JP | 63-125517 | | 5/1988 |
| JP | 63167113 A | * | 7/1988 |
| JP | 02254953 A | * | 10/1990 |
| JP | 03056713 A | * | 3/1991 |
| JP | 4-8909 | | 1/1992 |
| JP | 05106633 A | * | 4/1993 |
| JP | 05111208 A | * | 4/1993 |
| JP | 7-208457 A | | 8/1995 |
| JP | 07285060 A | * | 10/1995 |
| JP | 8-105446 A | | 4/1996 |
| JP | 08-289523 | | 11/1996 |
| JP | 09276750 A | * | 10/1997 |
| JP | 09303399 A | * | 11/1997 |
| JP | 11-103554 A | | 4/1999 |
| JP | 11-103554 A | | 4/1999 |
| JP | 2000060053 A | * | 2/2000 |
| JP | 2000235766 A | * | 8/2000 |
| JP | 2000-352414 | | 12/2000 |
| JP | 2001-107946 A | | 4/2001 |
| JP | 2001238422 A | * | 8/2001 |
| JP | 2001-289568 | | 10/2001 |
| JP | 2001271828 A | * | 10/2001 |
| JP | 2002061658 A | * | 2/2002 |
| JP | 2002061659 A | * | 2/2002 |
| JP | 2002-130257 A | | 5/2002 |
| JP | 2002139041 A | * | 5/2002 |
| JP | 2003-034331 | | 2/2003 |
| JP | 2004-52999 A | | 2/2004 |
| WO | WO 02/10602 A1 | | 2/2002 |
| WO | WO 03/027521 | | 4/2003 |

OTHER PUBLICATIONS

English Translation of Decision of Refusal issued in copending Japanese Patent Application No. 2003-053231 dated Jun. 12, 2007.

* cited by examiner

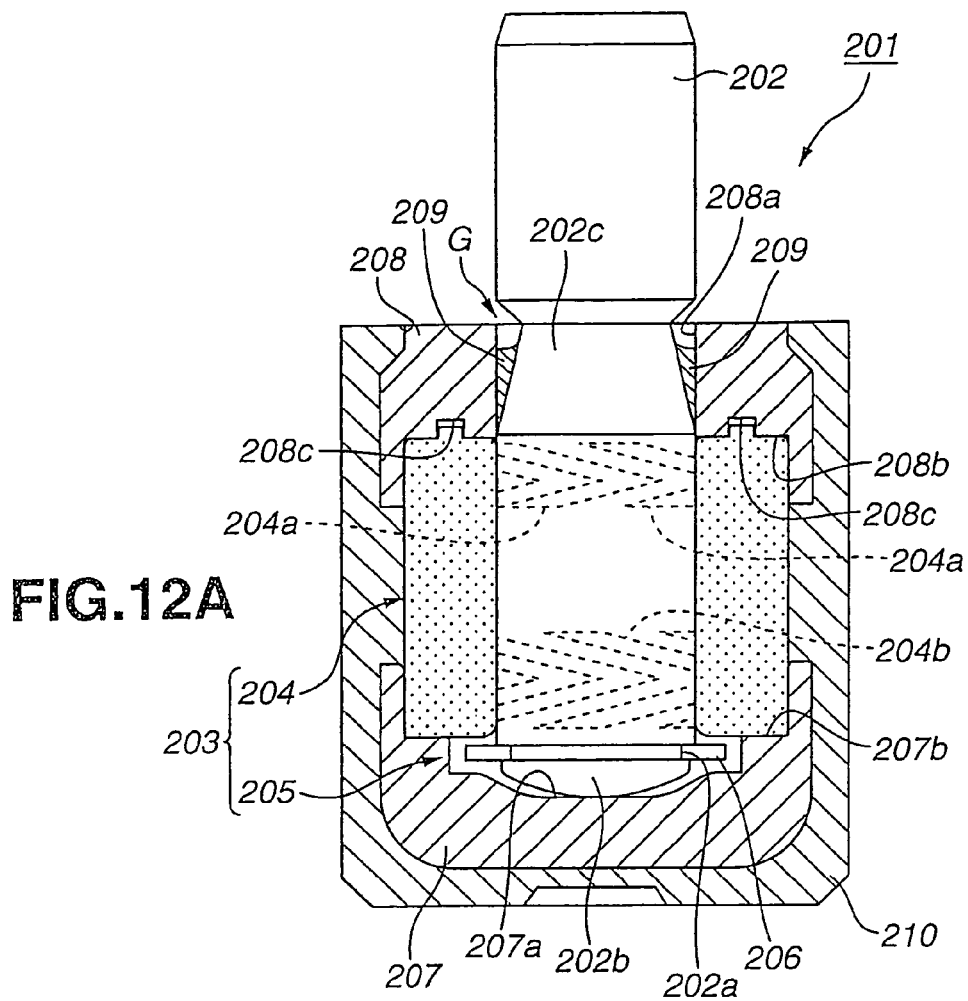
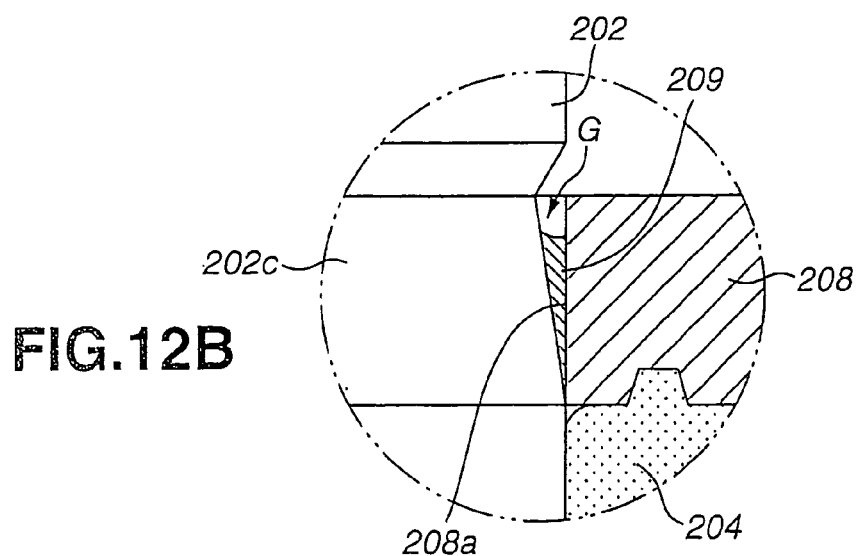
FIG.12A
FIG.12B

BEARING UNIT AND ROTARY DRIVE USING THE SAME

The present application is a divisional of patent application Ser. No. 10/506,433, filed Apr. 4, 2005, now U.S. Pat. No. 7,455,456 which claims the priority of co-pending Japanese Patent Application No. 2003-300529 dated Aug. 25, 2003, Japanese Patent Application No. 2003-053231 dated Feb. 28, 2003 and Japanese Patent Application No. 2003-004928 dated Jan. 10, 2003, all filed in Japan. These patent applications are incorporated herein by reference.

TECHNICAL FIELD

This invention relates to a bearing unit and a rotary drive using such a bearing unit.

BACKGROUND ART

A bearing unit rotatably supports a shaft and is typically arranged in a rotary drive such as a fan motor.

A bearing unit of the type under consideration is used with an I-shaped shaft (also referred to as straight shaft) that is rotatably supported by using lubricating oil. Japanese Patent Publication No. 3265906 describes such a bearing unit. The bearing unit 540 disclosed in the patent publication has a configuration as shown in FIG. 1 of the accompanying drawings. Referring to FIG. 1, the bearing unit 540 rotatably supports a shaft 541 by means of a radial bearing 542 and a thrust bearing 543. The radial bearing 542 is supported by a holding member 544 while the thrust bearing 542 is supported by a bottom plate 545. An anti-shaft-release member 546 is fitted to the shaft 541.

Since it is impossible to insert the anti-shaft-release member 546 in the last step of assembly due to the structure of the bearing unit 540, it is necessary to employ a step of mounting the thrust bearing 543 and the bottom plate 545 in the holding member 544 as the last assembling step. In other words, because of the use of such an assembling step, the housing of the bearing unit 540 needs to comprise a plurality of members, which include the holding member 544 and the bottom plate 545, for the purpose of providing the shaft 541 with the anti-shaft-release member 546. Then, it is difficult to completely seal the binding section 548 of the holding member 544 and the bottom plate 545. As a result, the lubricating oil filled in the inside can leak out.

Additionally, end facet 547 of the radial bearing 542 is exposed to the outside and lubricating oil can highly possibly disperse and evaporate from there.

Since the known bearing unit 540 comprises the anti-shaft-release member 546 for the shaft 541, the housing that takes the role of surrounding the bearing unit 540 and preventing lubricating oil from leaking and dispersing is formed by a plurality of members. Therefore, there is a problem that lubricating oil is apt to leak out through the binding sections of various members of the housing. There is also a problem that such a bearing unit needs to be prepared by way of complex steps to consequently raise the manufacturing cost.

Another known proposed bearing unit employs as a bearing means for supporting a shaft made of metal such as stainless steel a radial bearing and a thrust bearing that are sintered and oil-impregnated bearings or hydrodynamic fluid bearings and supported by respective housing members made of metal such as brass, of which the radial bearing is provided with a seal member for minimizing the leakage of the lubricating oil filled in an inner peripheral section thereof. With the proposed bearing unit, the shaft is rotatably supported by the radial bearing and the thrust bearing so that the shaft is supported and rotatable relative to the housing members.

With this bearing unit, lubricating oil is indispensable for the shaft to revolve smoothly and prevented from leaking out by a seal member. Lubricating oil can ooze out through every gap and leak to the outside of the bearing unit to shorten the service life of the bearing unit. Therefore, the binding sections of members of the bearing unit need to be hermetically sealed. For this purpose, the applicant of the present invention proposed a bearing unit wherein the binding section of a metal-made housing member and a seal member is hermetically sealed by means of a UV-ray set type adhesive agent in Japanese Patent Application No. 2001-289568 and another bearing unit wherein a resin-made housing member is used and integrally molded with a seal member in Japanese Patent Application No. 2002-34331.

However, with such bearing units, it is difficult to satisfactorily maintain the stability and the reliability.

For example, when a housing member and a seal member are prepared separately, it is difficult to completely bond or bind them together and hence to reliably prevent lubricating oil from leaking through the binding section thereof. Additionally, it is a highly complex and difficult operation to uniformly apply a polymeric packing material such as adhesive to the entire periphery of the binding section. It is also difficult to see if the binding section is completely sealed without micro-gaps. The net result will be either unsatisfactory reliability or prohibitive cost.

Leakage of lubricating oil cause to result in an unstable service life, a reduced reliability of the bearing unit and/or adverse effects (such as chemical attack phenomenon) on the externally disposed components of the bearing unit. For instance, when such a bearing unit is applied to a hard disc drive (HDD), leakage of lubricating oil containing organic substances cause to give rise to stiction and haze (a clouded disc surface).

When a housing member and a seal member are integrally molded, no gap is produced between them. However, if the gap between the seal member, which is now part of the housing member, and the shaft needs to be minimized when the housing is molded with the shaft supported by a bearing unit, it is difficult to guarantee the accuracy of minimizing the gap. For instance, any variance in the gap between the seal section and the shaft can influence the level of the oil surface and hence, if the volume of oil is large, lubricating oil cause to disperse to the outside when the oil temperature rises and/or when the ambient pressure changes.

The PCT Application Laid-Open No. WO03/027521 describes another known bearing unit adapted to rotatably support a rotary shaft. Referring to FIG. 2 of the accompanying drawings, the bearing unit 660 is able to reliably prevent viscous fluid from leaking to the outside of the housing that is filled with viscous fluid even when the internal pressure of the housing changes due to a change in the environmental factors including atmospheric pressure and/or ambient temperature.

The bearing unit 660 comprises a radial bearing 644 and a thrust bearing 650, by which a rotary shaft 641 is rotatably supported, air releasing passage sections 662 being arranged between a housing 661 that is filled with lubricating oil 653 and the inner peripheral surface of an outer sleeve 667 that covers the housing 661.

The air releasing passage sections 662 are provided in order to prevent lubricating oil 653 from leaking to the outside of the bearing unit 660 when the atmospheric pressure falls due to an altitude change and the air inside the housing 661 expands. The housing 661 may be provided with one or more than one air releasing passage sections 662. In the illustrated bearing unit 660, three air releasing passage sections 662 are arranged on the outer periphery of the housing 661 and angularly separated from each other at regular intervals. The air releasing passage sections 662 can be formed in a simple manner when the housing 661 is produced by outsert molding along with the thrust bearing 650 that contains the radial bearing 644. If the air releasing passage sections 662 have a relatively complex profile, they can be formed when the housing 661 and the thrust bearing 650 are molded by using synthetic resin.

With the provision of such air releasing passage sections 662, it is possible to release the air that comes into the bearing unit when the rotary shaft 641 is inserted into the radial bearing 644 and placed in position.

In the bearing unit 660, each of the air releasing passage sections 662 has a first passage way 663 and a second passage way 664. The first passage way 663 is formed to extend along a radial direction of the housing 661 from an internal space 665 that is located near the thrust bearing 650. The inner end of the first passage way 663 is connected to the internal space 665 where the thrust bearing 650, which projects from the bottom closure section 647 of the housing 661, is located. The outer end of the first passage way 663 is connected to the second passage way 664. The second passage way 664 is exposed to the outer peripheral surface of the housing 661 and extends along the axial direction of the housing 661. While the air releasing passage section 662 including the first passage way 663 and the second passage way 664 has a relatively complex profile, it can be formed with ease when the housing 661 and the thrust bearing 650 are molded from synthetic resin.

As the bearing unit 660 is provided with the air releasing passage section 662, the inside of the housing 661 is not hermetically sealed. Therefore, the internal static pressure of the housing 661 does not fall when the rotary shaft 641 revolves relative to the housing 661 and hence the air remaining in the housing 661 does not expand to force out the lubricating oil in the inside.

The bearing unit 660 communicates with the outside by way of a plurality of sections including the air releasing passage sections 662 and the exposed part of the rotary shaft 641. In other words, the former operate as air inlet port while the latter operates as air outlet port so that lubricating oil cause to disperse when impact is applied to the bearing unit 660. In short, the bearing unit 660 is vulnerable to impact.

Japanese Patent Application Laid-Open Publication No. 2000-352414 describes still another bearing unit for rotatably supporting a rotary shaft. As shown in FIG. 3 of the accompanying drawings, the bearing unit 680 of the above cited patent document is adapted to rotatably support a rotary shaft 681 and comprises a radial bearing 682 for supporting the rotary shaft 681 in a peripheral direction, a thrust bearing 683 for supporting the rotary shaft 681 in a thrusting direction and a housing 685 containing the radial bearing 682 and the thrust bearing 683.

The radial bearing 682 of the bearing unit 680 operates as hydrodynamic fluid bearing with the lubricating oil filled in the housing 685, which lubricating oil is viscous fluid. Dynamic pressure generating grooves 684 are formed on the inner peripheral surface of the radial bearing 682, along which the rotary shaft 681 is inserted.

The radial bearing 682 is provided on the outer peripheral surface thereof with groove-shaped axial air passage ways 686 and groove-shaped radial air passage ways 687 that are used as air releasing passage ways when inserting the shaft member into the inner space of the bearing main body.

As shown in FIG. 3, housing 685 that contains the radial bearing 682, which by turn supports the rotary shaft 681, has a bottomed hollow cylindrical profile so as to surround the lateral surface and the bottom surface of the radial bearing 682, which also has a hollow cylindrical profile.

A compressed resilient body 688 is arranged in the upper opening of the housing 685 so as to be pressed against the inner peripheral surface of the housing 685 to operate as caulking member.

The rotary shaft 681 is inserted into the housing 685 of the bearing unit 680 that is caulked by the resilient body 688. At this time, air is released from the inside of the housing 685 to the outside by way of the axial air passage ways 686 and the radial air passage ways 687 so that the operation of inserting the rotary shaft 681 can be conducted smoothly.

Since the bearing main body is surrounded by two members of a housing 685 and a resilient body 688 in the bearing unit 680 of FIG. 3, lubricating oil cause to ooze out through the junction of the housing 685 and the resilient body 688.

DISCLOSURE OF THE INVENTION

Therefore, it is an object of the present invention to provide a bearing unit that dissolves the problems of the bearing units that have been proposed to date and a rotary drive using such a bearing unit.

Another object of the present invention is to provide a bearing unit that is compact and highly reliable and can enjoy a long service life and a rotary drive using such a bearing unit.

Still another object of the present invention is to provide a bearing unit that can prevent the shaft supported by the bearings of the bearing unit from slipping away and the lubricating oil contained in the inside of the bearing unit from leaking and a rotary drive using such a bearing unit.

Still another object of the present invention is to provide a bearing unit that can prevent a phenomenon of leakage of the viscous fluid such as lubricating oil that is filled in the housing of the bearing unit from taking place and show an excellent lubricating performance when the shaft is driven to revolve relative to the housing to reduce the internal pressure of the housing and expand the residual air in the housing and a rotary drive using such a bearing unit.

Still another object of the present invention is to provide a bearing unit from which viscous fluid such as lubricating oil can hardly disperse when impact is applied thereto and a rotary drive using such a bearing unit.

A further object of the present invention is to provide a bearing unit that can effectively prevent viscous fluid such as lubricating oil from oozing out from the housing of the bearing unit that surrounds the bearings of the unit and a rotary drive using such a bearing unit.

In an aspect of the present invention, the above objects are achieved by providing a bearing unit for rotatably supporting a shaft, the bearing unit comprising: a seamless holding member with a gap allowing a shaft to run through and extend to the outside; a bearing arranged in the inside of the holding member to support the shaft so as to make it radially revolvable; an anti-shaft-release member fitted to the shaft so as to abut the bearing in order to prevent the shaft from slipping away in the thrusting direction; and a space-forming member arranged in the inside of the holding member so as to secure a space around the anti-shaft-release member.

A bearing unit according to the invention comprises a holding member and all the remaining component of the bearing unit are arranged in the inside of the holding member. The bearing unit radially supports the shaft so as to allow the latter to revolve. The anti-shaft-release member is fitted to the shaft so as to abut the bearing and prevent the shaft from slipping away along the thrusting direction. The space-forming member is arranged inside the holding member. The space-forming member is adapted to secure space around the anti-shaft-release member. With this arrangement of providing such a space-forming member, a small anti-shaft-release member can be arranged inside the holding member of the bearing unit. As a result, it is possible to downsize the rotary drive, which may be a motor, to be used with the bearing unit. Since the bearing unit comprises the anti-shaft-release member and can prevent the shaft from slipping away in the assembled state, it is easy to handle the bearing unit when it is fitted to a rotary drive.

The holding member is formed as seamless member with an opening that allows the corresponding end of the shaft to project to the outside and hence it would not allow lubricating oil from leaking out. Thus, it is possible to provide a compact and highly reliable bearing unit that can enjoy a long service life.

The number of components is reduced when the anti-shaft-release member and the shaft are formed integrally with each other.

The holding member is made of a polymeric material and the gap is defined by the holding member and the shaft at the position where the shaft extends from the holding member.

The space-forming member of a bearing unit according to the invention is made of a polymeric material and operates as thrust bearing for rotatably supporting the shaft at an end of the latter in the thrusting direction. The end of the shaft is made to show a spherical profile and the thrust bearing is a pivot bearing.

With this arrangement, the space-forming member can not only secure space around the anti-shaft-release member but also rotatably support the corresponding end of the shaft as pivot bearing in the thrusting direction so that it is possible to reduce the number of components and downsize the bearing unit.

A bearing unit according to the invention can generate dynamic pressure as the shaft revolves because it is provided with dynamic pressure generating grooves on the outer peripheral surface of the shaft or on the inner peripheral surface of the bearing.

A bearing unit according to the invention can generate dynamic pressure as the shaft revolves because additionally the surface of the anti-shaft-release member or the surface of the space-forming member arranged vis-à-vis the anti-shaft-release member is provided with dynamic pressure generating grooves.

Of a bearing unit according to the invention, the shaft and the space-forming member are made of an electrically conductive material and the space-forming member is exposed to the outside through the holding member. With this arrangement, the shaft can be grounded by way of the space-forming member in order to release any static electricity to the outside.

In another aspect of the present invention, there is provided a rotary drive including a bearing unit for rotatably supporting a shaft, the rotary drive comprising: a seamless holding member with a gap allowing a shaft to run through and extend to the outside; a bearing arranged in the inside of the holding member to support the shaft so as to make it radially revolvable; an anti-shaft-release member fitted to the shaft so as to abut the bearing in order to prevent the shaft from slipping away in the thrusting direction; and a space-forming member arranged in the inside of the holding member so as to secure a space around the anti-shaft-release member.

The bearing of this rotary drive is arranged in the inside of the holding member. The bearing radially supports the shaft so as to allow the latter to revolve. The anti-shaft-release member is fitted to the shaft so as to abut the bearing and prevent the shaft from slipping away along the thrusting direction.

The space-forming member is arranged inside the holding member. The space-forming member is adapted to secure space around the anti-shaft-release member. With this arrangement of providing such a space-forming member, the anti-shaft-release member is arranged inside the holding member of the bearing unit. As a result, it is possible to downsize the rotary drive, which may be a motor, to be used with the bearing unit.

In still another aspect of the invention, there is provided a bearing unit having a shaft and a bearing means for rotatably supporting the shaft, the bearing unit comprising: a lubricating oil seal member arranged between the shaft and the bearing means with a gap interposed between them; and a synthetic resin made housing for peripherally holding the lubricating oil seal member and the bearing means.

With a bearing unit according to the invention and having the above-defined configuration, it is possible to realize a seamless structure that binds the seal member and holding means without any gap between them by peripherally holding the seal member by the resin made housing. Thus, it is no longer necessary to seal the gap between the seal member and the housing by means of an adhesive agent or the like. A necessary gap is guaranteed between the seal member and the shaft by securing the processing precision and the molding precision of the member so that the variance of the gap can be sufficiently reduced.

In still another aspect of the invention, there is provided a bearing unit comprising: a shaft; a radial bearing for peripherally supporting the shaft; a thrust bearing for supporting an end of the shaft in the thrusting direction thereof; a space-forming member arranged outside the radial bearing and the thrust bearing; a housing having the space-forming member in the inside and hermetically sealed except a shaft receiving hole through which the shaft is made to extend; viscous fluid filled in the housing; and a communication passage way arranged between the space-forming member and the radial bearing so as to make the end in the thrusting direction of the shaft projecting from the radial bearing and the other end of the shaft communicate with each other.

With a bearing unit according to the invention and having the above described configuration, the end in the thrusting direction of the shaft projecting from the radial bearing that is located at the closed side of the shaft and the other end of the shaft projecting from the radial bearing that is located at the open side of the shaft where the shaft receiving hole is provided are made to communicate with each other by way of a communication passage way. Therefore, when the shaft is driven to revolve relative to the housing, the pressure reduction at the closed side of the shaft is minimized because the closed side of the shaft is made to communicate with the open side of the shaft. As the pressure reduction at the closed side is minimized, the residual air in the housing is suppressed against expanding to prevent viscous fluid such as lubricating oil from being forced to leak out.

With a bearing unit according to the invention and having the above described configuration, while the closed side end and the open side of the shaft are held in communication with each other, the shaft is exposed to the outside only at the other end that projects in the thrust direction from the radial bearing located at the closed side of the shaft through a minimally dimensioned gap of the shaft receiving hole. In other words, the communication passage way is formed in the housing, which is hermetically sealed except the shaft receiving hole so that the viscous fluid such as lubricating oil that is contained therein is prevented from dispersing by impact and also from oozing out.

Other objects and advantages of the present invention will become apparent from the following description that is made by referring to the accompanying drawings that illustrate preferred embodiments of the invention.

BRIEF DESCRIPTION OF THE DRAWINGS

FIGS. 12A and 12B are schematic cross sectional views of still another embodiment of bearing unit according to the invention;

BEST MODE FOR CARRYING OUT THE INVENTION

Now, preferred embodiments of the present invention will be described by referring to the accompanying drawings.

Figure 1:
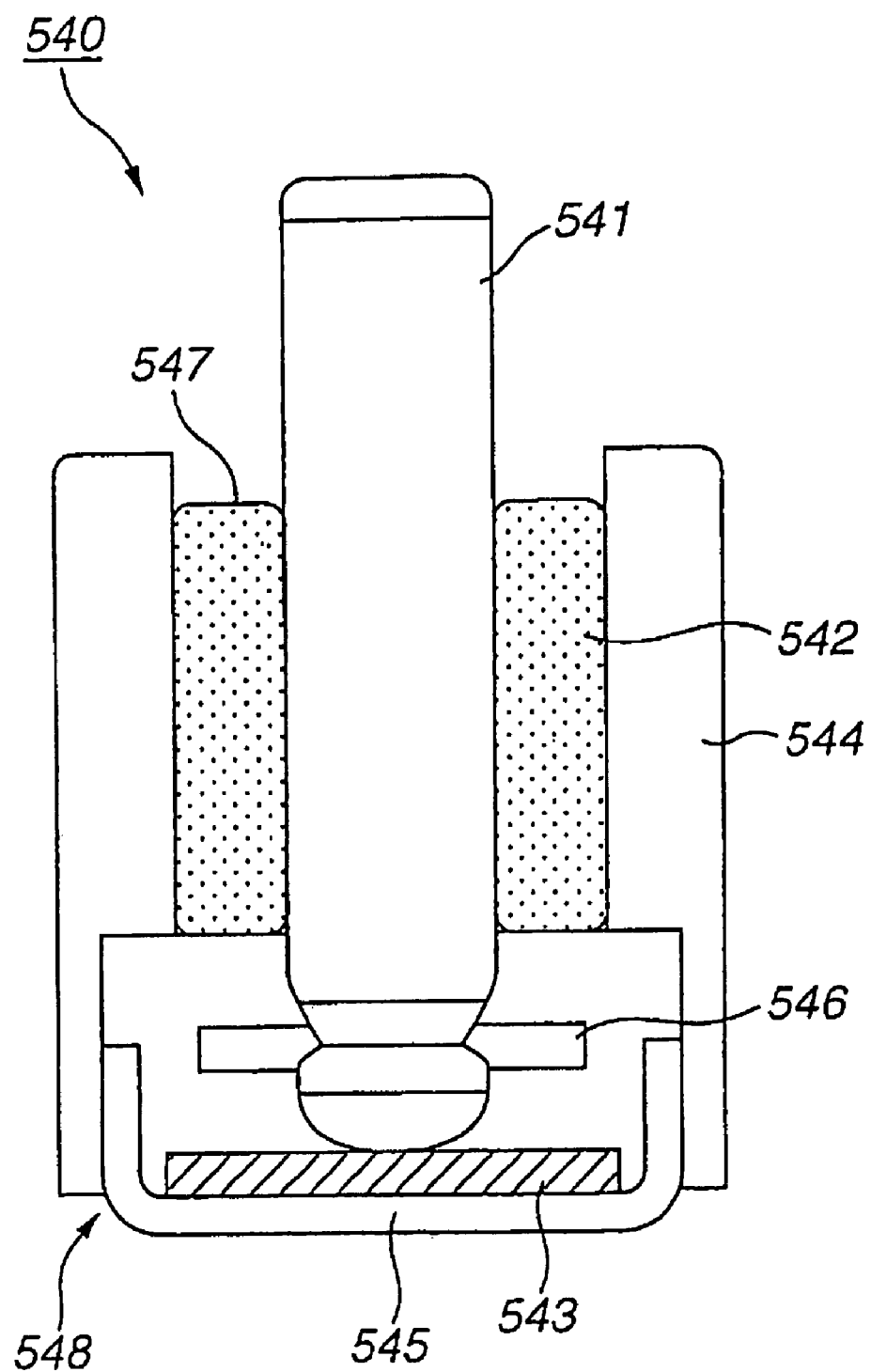
FIG. 1 is a schematic cross sectional view of a known bearing unit.
Figure 2:
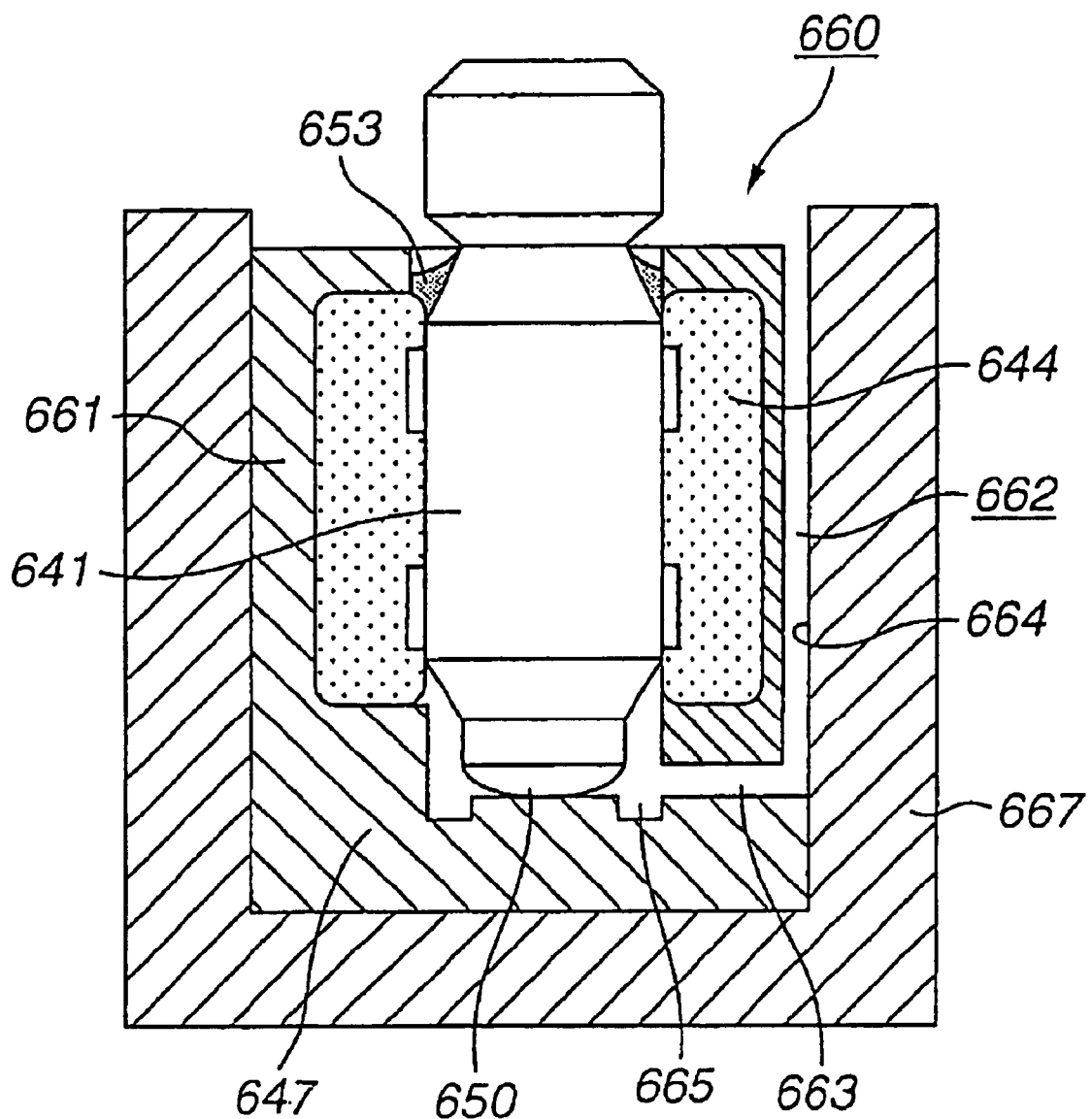
FIG. 2 is a schematic cross sectional view of another known bearing unit.
Figure 3:
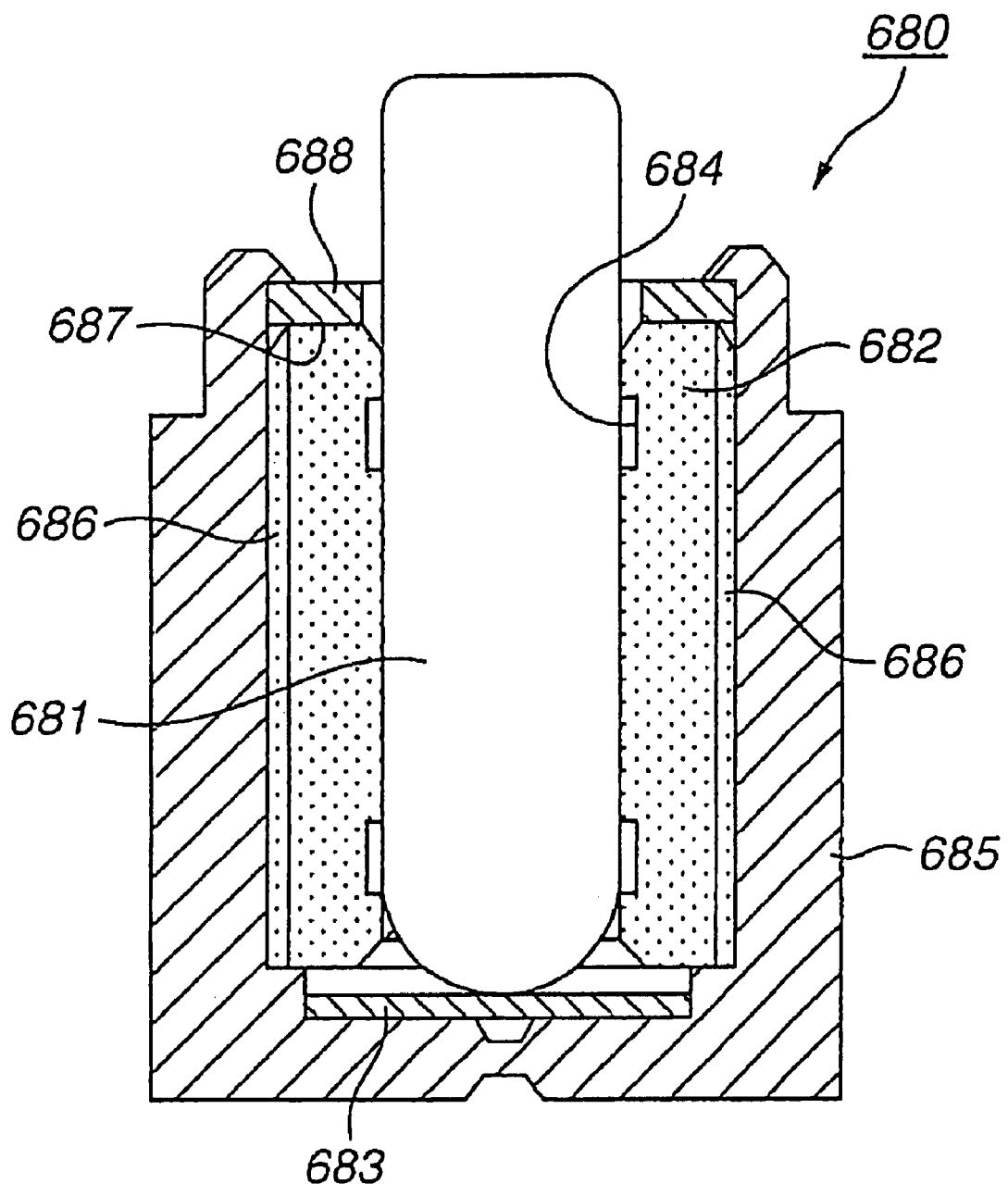
FIG. 3 is a schematic cross sectional view of still another known bearing unit.
Figure 4:
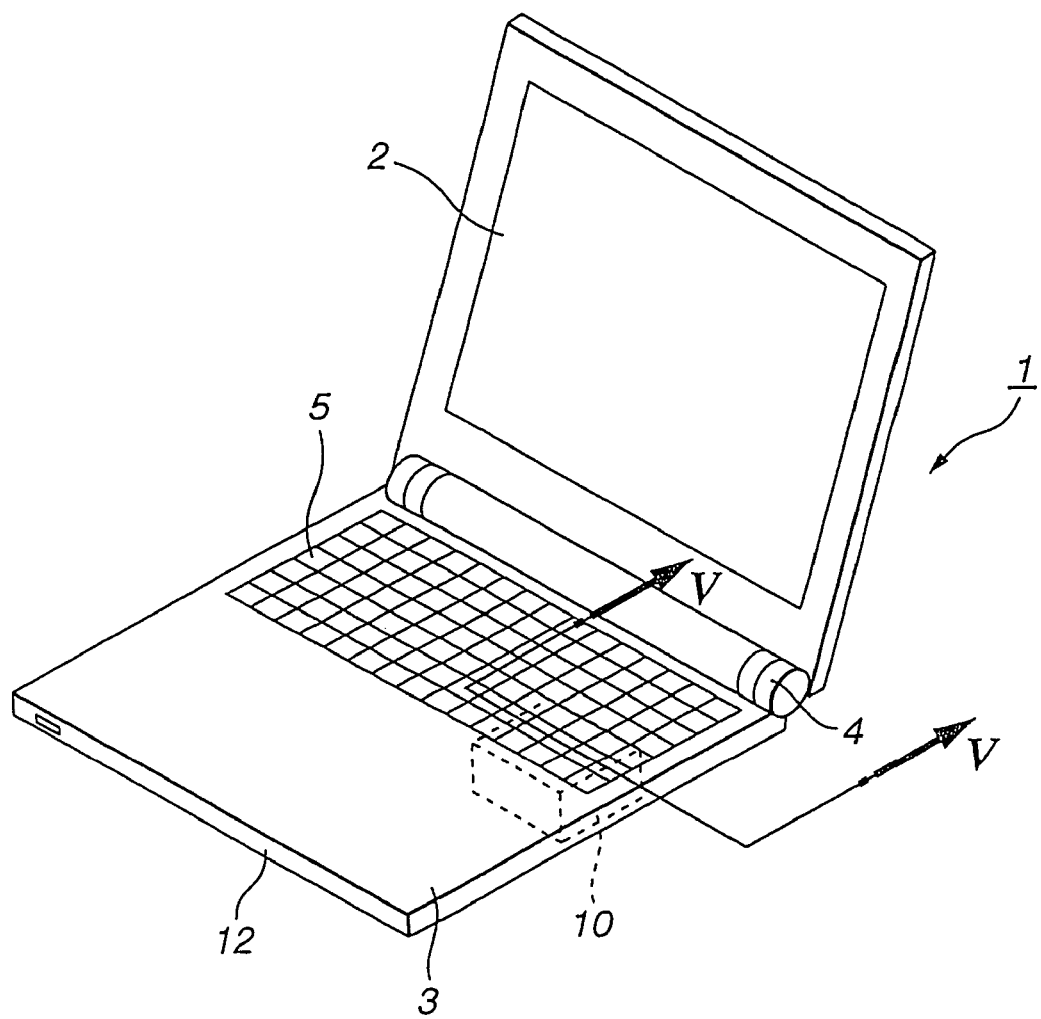
FIG. 4 is a schematic perspective view of an electronic device comprising a bearing unit according to the invention.

A bearing unit according to the invention can typically find an application in a portable computer 1 as shown in FIG. 4.

Referring to FIG. 4, the computer 1 has a display section 2 and a main body 3. The display section 2 is rotatably linked to the main body 3 by means of a link section 4. The main body 3 has a keyboard 5 and a cabinet 12. A heat-emitting device 10 is arranged in the cabinet 12.

Figure 5:
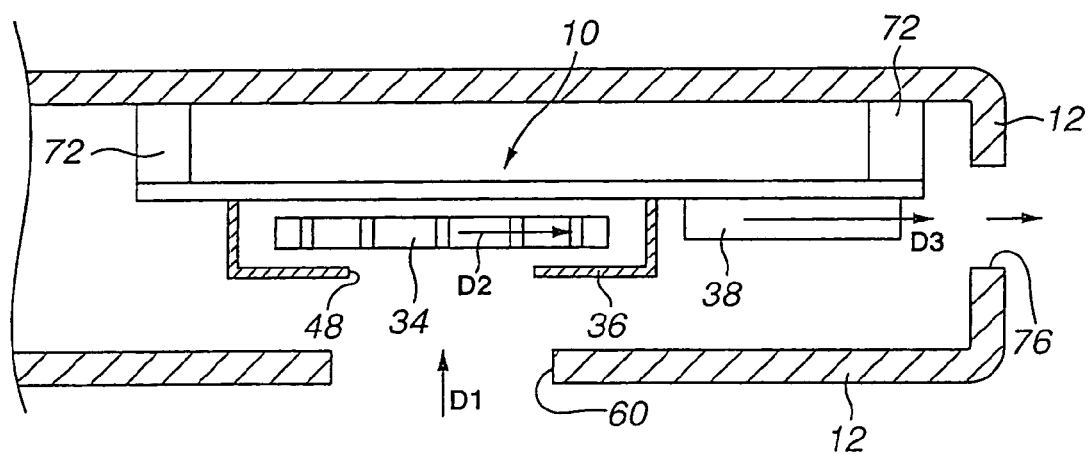
FIG. 5 is a schematic cross sectional view of the electronic device of FIG. 4 taken along line V-V in FIG. 4.
Figure 6:
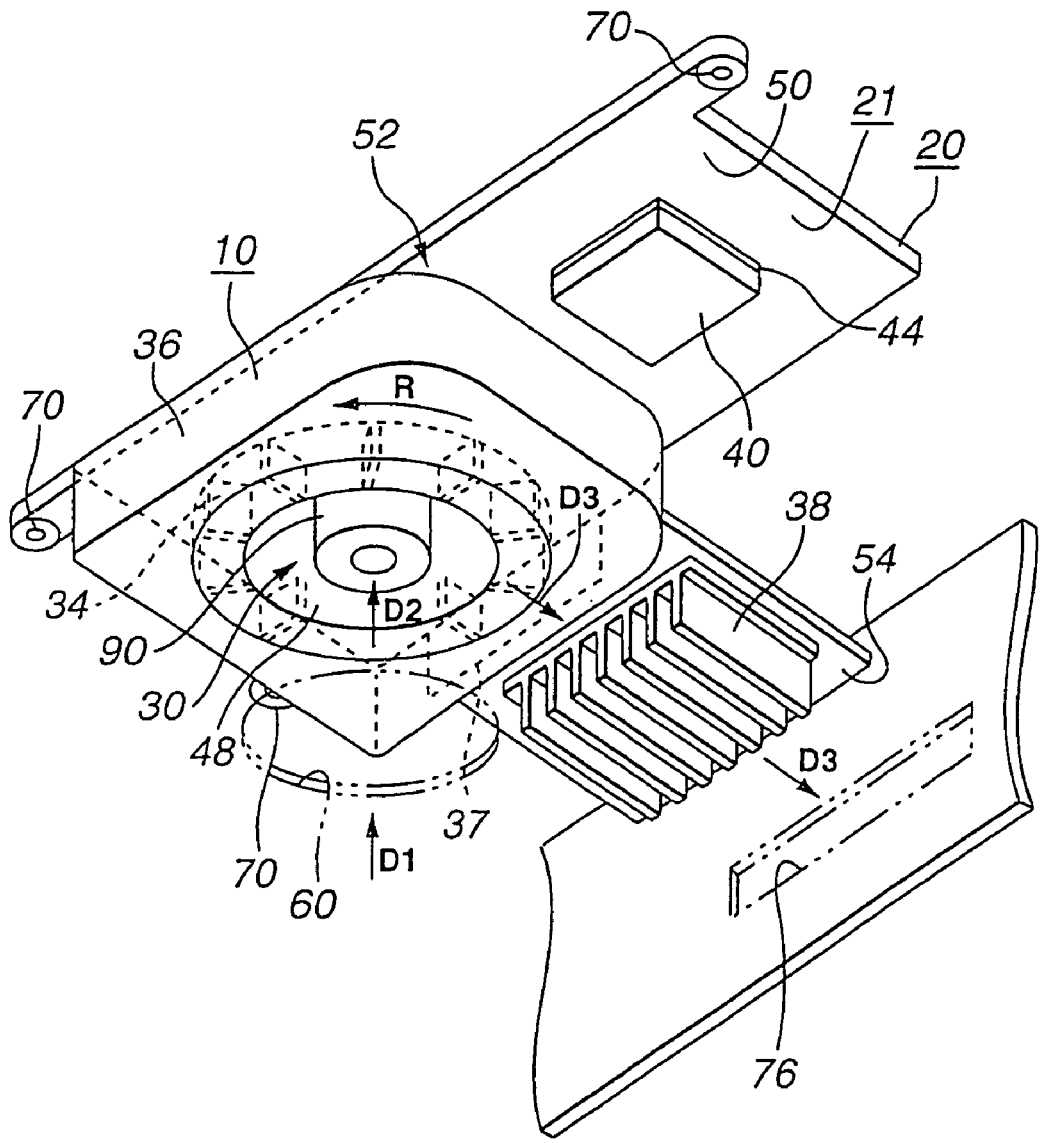
FIG. 6 is a schematic perspective view of a fan motor.

FIG. 5 is a schematic cross sectional view of the cabinet 12 of FIG. 4 taken along line V-V in FIG. 4. FIG. 6 is a schematic perspective view of the heat-emitting device 10 arranged in the cabinet 12 of FIG. 5.

As shown in FIG. 5, the heat-emitting device 10 is contained in the cabinet 12. The heat-emitting device 10 has a configuration as shown in FIG. 6. The heat-emitting device 10 is also referred to as cooling device and comprises a metal made base 20, a motor 30, a fan 34, that is a rotary body, a fan case 36 and a heat sink 38.

One of the surfaces, or surface 21, of the base 20 includes a first fitting surface 50, a second fitting surface 52 and a third fitting surface 54. When put together, the first fitting surface 50, the second fitting surface 52 and the third fitting surface 54 form a substantially L-shaped surface. A heat emitting element 40 is fitted to the first fitting surface 50 by way of a heat transmitting seal 44. The heat emitting element 40 may typically be a CPU (central processing unit) that emits heat when it is electrically energized to operate.

The fan case 36 and the motor 30 are rigidly fitted to the second fitting surface 52. The fan 34 and the motor 30 are contained in the inside of the fan case 36. The fan case 36 has a circular hole 48. The circular hole 48 is formed at a position of the fan case 36 vis-à-vis the hole 60 bored through the bottom of the cabinet 12 as shown in FIG. 5. The fan case 36 has another hole 37 formed along the side located close to the heat sink 38 that is to be cooled by supplying cooling air.

The heat sink 38 is rigidly fitted to the third fitting surface 54. The heat sink 38 typically has a corrugated profile or a fan-shaped profile and is made of a metal that performs well for emitting heat such as aluminum. The base 20 and the fan case 36 may be made of a metal that performs well for emitting heat such as aluminum or iron. The base 20 is provided with fitting holes 70 at appropriate positions. Thus, the base 20 is rigidly secured to the cabinet 12 as screws are driving into the respective bosses 72 arranged on the inner surface side of the cabinet 12 by way of the respective holes 70.

As shown in FIGS. 5 and 6, the heat sink 38 is arranged at a position vis-à-vis the hole 76 formed through a lateral wall of the cabinet 12. With this arrangement, as the motor 30 is driven, the fan 34 continuously revolves in the sense as indicted by arrow R in FIG. 6 so that air is driven out from the inside of the cabinet 12 to the outside through the lateral hole 76 by way of the hole 60 and the hole 48 in the directions indicated by arrows D1, D2 and D3. At this time, the heat generated by the heat emitting element 40 is transmitted to the fitting surface 54 by way of the fitting surfaces 50, 52 of the base 20 so that consequently the heat is transmitted to the heat sink 38. As the air flow that is produced by the revolutions of the fan 34 takes place in three directions indicated by the arrows D1, D2 and D3, the heat transmitted to the heat sink 38 is released to the outside by way of the lateral hole 76 of the cabinet.

Figure 7:
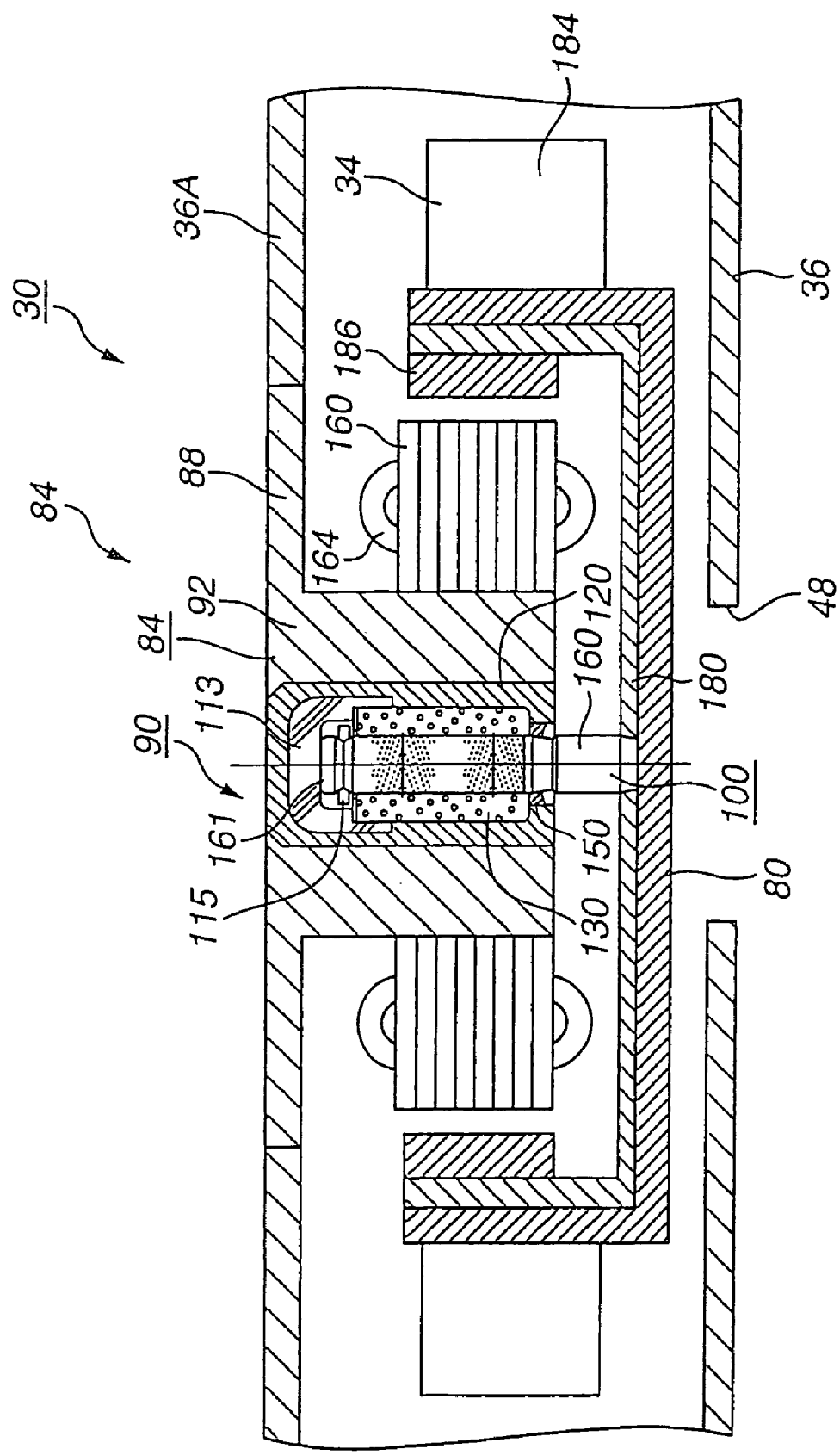
FIG. 7 is a schematic cross sectional view of the rotor and the stator of a fan motor.

FIG. 7 is a schematic cross sectional view of the motor 30 of FIG. 6. The motor 30 has a rotor 80 and a stator 84.

The motor 30 and the fan 34 are contained in the fan case 36 and the stator 84 is integrally arranged on the top section 36A of the fan case 36. The stator 84 has a stator yoke 88, a bearing unit 90, a coil 164 and a core 160.

The stator yoke 88 may be integral with the top section 36A of the fan case 36 or separated from the latter. It is typically made of iron or stainless steel. The housing 120 of the bearing unit 90 is rigidly secured to the inside of the holder 92 by press fitting and/or adhesion. The holder 92 is a cylindrical part of the stator 84.

Roughly speaking, the bearing unit 90 has a shaft 100, a radial bearing 130, a space-forming member 113, a holding member 120 and lubricating oil 150.

Figure 8:
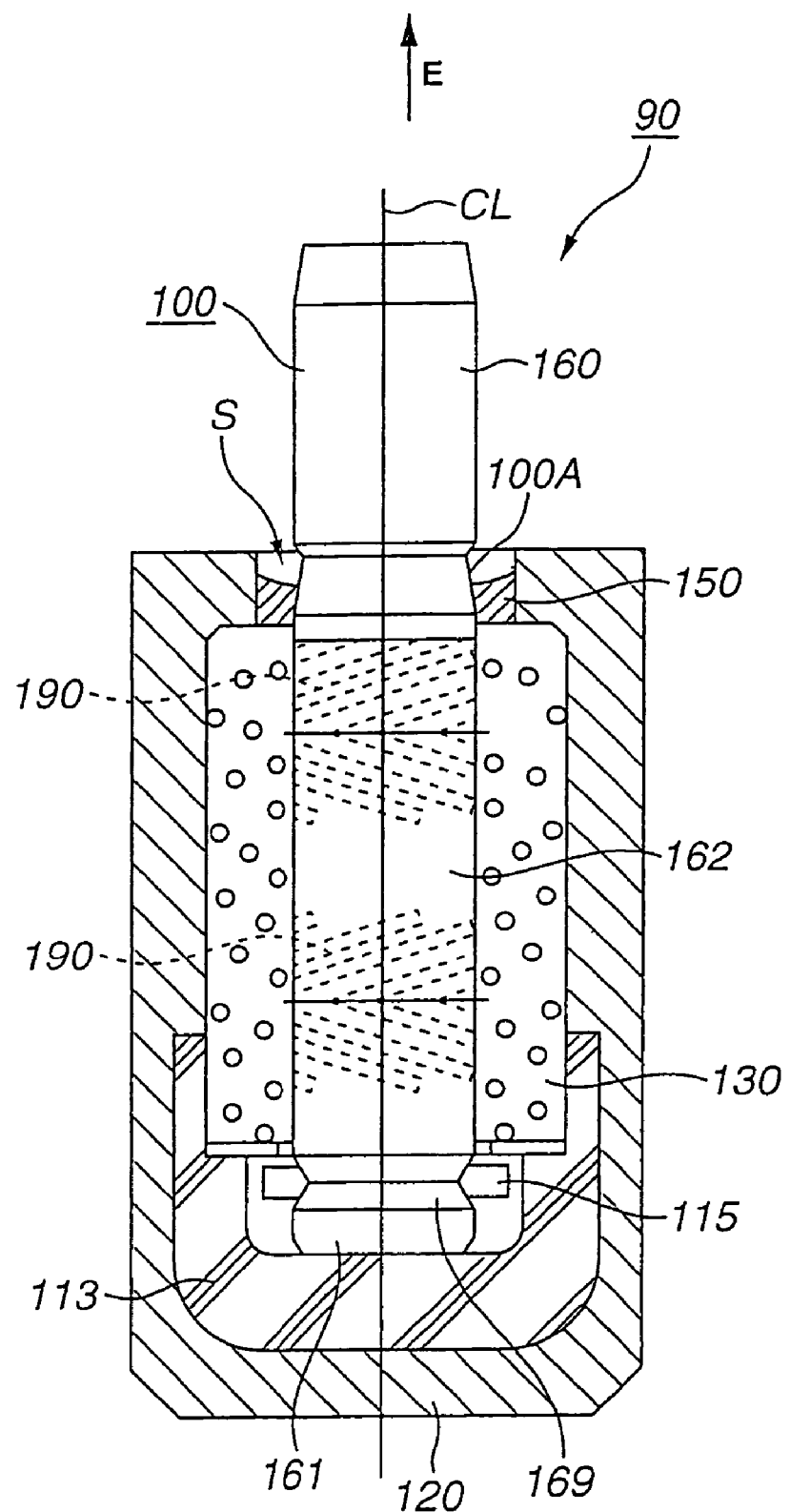
FIG. 8 is a schematic cross sectional view of an embodiment of bearing unit according to the invention that is used in the fan motor of FIG. 7.

FIG. 8 is an enlarged view of the bearing unit 90 shown in FIG. 7, illustrating its configuration.

Now, the structure of the bearing unit 90 will be described in greater detail by referring to FIG. 8.

The shaft 100 is a so-called I-shaped shaft, which is also referred to as straight type shaft. The shaft 100 is typically made of stainless steel. The shaft 100 has an exposed end section 160, an inner end section 161 and a tapered section 100A. The exposed end section 160 and the shaft outer peripheral section 162 may be made to have a same diameter. The tapered section 100A is a tapered part located between the exposed end section 160 and the shaft outer peripheral section 162. The tapered section 100A is tapered from the shaft outer peripheral section 162 toward the exposed end section 160. The exposed end section 160 is a part of the shaft 100 that extends from the gap S of the holding member 120 so as to be exposed to the outside. The tapered section 100A is arranged at the position located vis-à-vis the gap S.

The radial bearing 130 illustrated in FIG. 8 is a cylindrical bearing that may typically be made of sintered metal so as to operate as hydrodynamic fluid bearing. The radial bearing 130 has a pair of two dynamic pressure generating grooves 190, 190 formed on the inner peripheral surface thereof. The dynamic pressure generating grooves 190, 190 are separated from each other by a predetermined distance. One of the dynamic pressure generating grooves 190, 190 is located near the gap S, while the other dynamic pressure generating groove 190 is located at the side of the inner end section 161. For example, herring bone grooves may be adopted for the dynamic pressure generating grooves 190, 190. The radial bearing 130 rotatably and radially supports the shaft 100.

An anti-shaft-release member 115 is also illustrated in FIG. 8. The anti-shaft-release member 115 may be made of a polymeric material such as nylon or provided as an E-ring that is made of metal. The anti-shaft-release member 115 is mechanically fitted into a fitting recess 169 formed at the side of the inner end section 161 of the shaft 100. The anti-shaft-release member 115 prevents the shaft 100 from slipping out from the radial bearing 130 in the direction of E shown in FIG. 8 along the central axis CL of the shaft 100.

The space-forming member 113 shown in FIG. 8 is a member for securing a space around the anti-shaft-release member 115. The space-forming member 113 is arranged in the holding member 120. The space-forming member 113 has a squirrel cage-shaped member showing a U-shaped cross sectional view. The space-forming member 113 is typically made of a polymeric material such as nylon or a metal material such as brass.

The holding member 120 show in FIG. 8 is used to contain the radial bearing 130, the shaft 100, the anti-shaft-release member 115 and the space-forming member 113 in a sealed and seamless state. The holding member 120 is also referred to as housing and has a sole gap S arranged vis-à-vis the tapered section 100A. The holding member 120 is typically made of a polymeric material such as nylon, LCP (liquid crystal polymer) or Teflon (tradename).

Lubricating oil is filled into the space among the radial bearing 130, the shaft outer peripheral section 162 of the shaft 100, the anti-shaft-release member 113 and the space-forming member 113.

The bearing unit 90 shown in FIG. 8 is provided at a position near the exposed end 160 of the shaft 100 with a radially arranged gap S. Since the bearing unit 90 is completely covered by the holding member 120, which is a seamless member, except the gap S, lubricating oil would not leak to the outside of the holding member 120 and hence the bearing unit 90 is highly reliable.

The bearing unit 90 is provided in the inside with an anti-shaft-release member 115 that prevents the shaft 100 from slipping away so that it is easy to handle the motor that is equipped with the bearing unit 90.

The shaft 100 is provided with a tapered section 100A at a position located vis-à-vis the gap S. The tapered section 100A and the gap S cooperate to form a surface tension seal. A surface tension seal operates as a lubricating oil holding means that utilizes the capillary phenomenon. In the case of the bearing unit 90, lubricating oil is drawn toward the side where that gap S is narrower, or toward the inside of the bearing unit 90 and hence would not leak to the outside. The principle of such a surface tension seal lies in the provision of a tapered section 100A to give rise to a pressure gradient there and draw the lubricating oil there toward the inside of the bearing unit 90. The tapered section 100A may be arranged either on the shaft 100 or on the holding member 120.

Now, the reason why an anti-shaft-release member 115 has to be provided will be described below.

In the case of a motor 30 equipped with a bearing unit 90 according to the invention and shown in FIG. 7, the rotor 80 would slip away when the motor 30 is subjected to impact unless the rotor 80 including the shaft 100 is provided with some anti-release means. Therefore, it is absolutely necessary to provide the rotor 80 with an anti-release means in view of the anti-impact performance of the motor 30.

In the case of a spindle motor to be used as optical disc drive, it is also necessary to provide some anti-release means in order to prevent the rotor 80 from slipping away when an optical disc is mounted or dismounted.

Conventionally, an anti-release member that is necessary for the rotor section is arranged outside the bearing unit or, if it is arranged in the inside of the bearing unit, the holding member of the bearing unit is made to have a plurality of components so that it may be assembled after arranging the anti-release member in the inside of the bearing unit. However, the former arrangement is accompanied by the drawback that the motor inevitably has large outer dimensions and the operation of assembling the motor is a complex one. The latter arrangement, on the other hand, is accompanied by the drawback that the holding member includes a binding section and lubricating oil can easily leak through it.

To the contrary, in a bearing unit 90 according to the invention, the anti-shaft-release member 115 is arranged in the inside of the bearing unit 90 and the holding member 120 is a seamless member. Thus, the bearing unit 90 can be easily mounted in the motor 30 and there is no risk for lubricating oil to leak out. Thus, a bearing unit 90 according to the invention is highly reliable and can enjoy a long service life.

Figure 9:
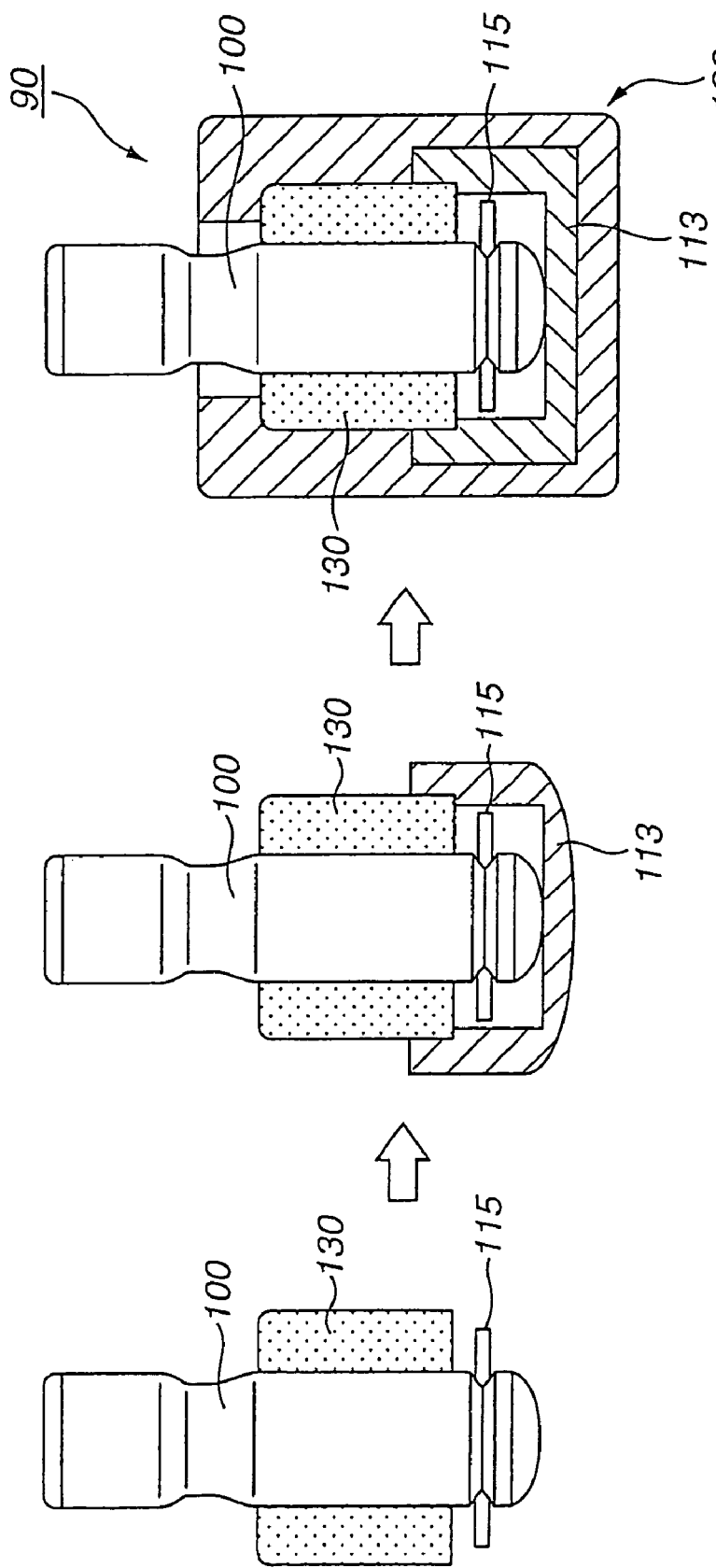
FIGS. 9A through 9C are schematic cross sectional views of the bearing unit of FIG. 8, showing assembling steps thereof.

FIGS. 9A through 9C are schematic cross sectional views of the bearing unit 90 of FIG. 8, showing assembling steps thereof.

Referring, firstly, to FIG. 9A, the shaft 100 to which the anti-shaft-release member 115 is fitted is inserted into the radial bearing 130.

Then, as shown in FIG. 9B, the space-forming member 113 is fitted to the radial bearing 130. Thereafter, as shown in FIG. 9C, the holding member 120 is formed typically by outsert molding.

The lubricating oil is filled into the bearing unit 90 typically by vacuum impregnation and the volume of lubricating oil is regulated to produce a complete bearing unit 90.

Due to the provision of the space-forming member 113, a gap is secured around the anti-shaft-release member 115 and the shaft 100 is rotatably supported with the anti-shaft-release member 115 if the holding member 120 is formed from resin by outsert molding.

In the instance of FIG. 8, the inner bottom surface of the space-forming member 113 also operates as thrust bearing for rotatably supporting the inner end section 161 of the shaft 100 in the thrusting direction. The space-forming member 113 rotatably supports the inner end section 161 as pivot.

Figure 10:
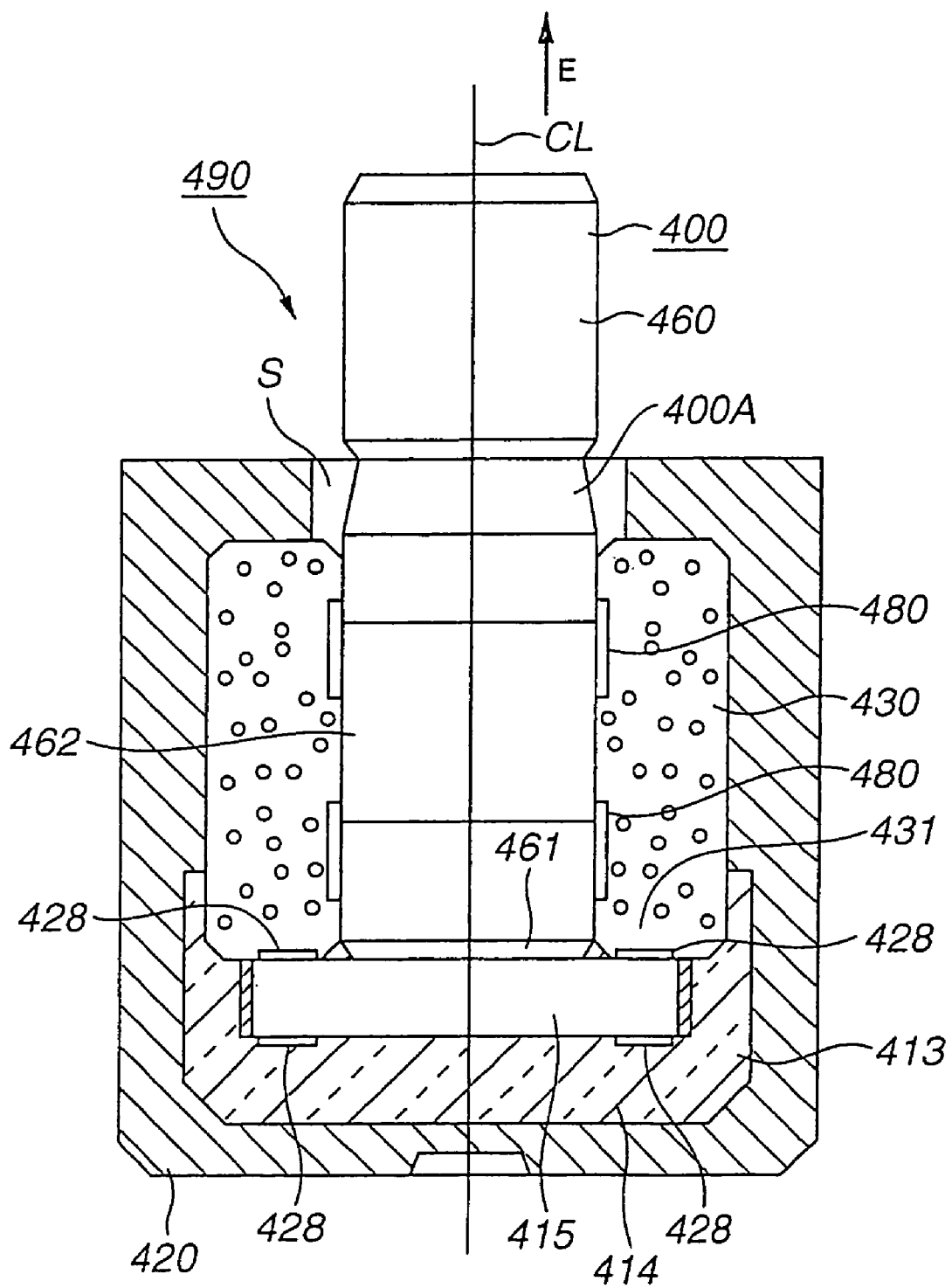
FIG. 10 is a schematic cross sectional view of another embodiment of bearing unit according to the invention.

A bearing unit according to the invention may alternatively have a configuration as shown in FIG. 10. The bearing unit 490 shown in FIG. 10 comprises a shaft 400, an anti-shaft-release member 415, a radial bearing 430, a space-forming member 413 and a holding member 420.

Of the bearing unit 490 shown in FIG. 10, the disc-shaped anti-shaft-release member 415 is integrally formed with the inner end section 461 of the shaft 400. In other words, the shaft 400 is formed with the anti-shaft-release member 415 in such a way that the longitudinal cross section thereof shows a substantially T-shaped profile.

Dynamic pressure generating grooves 428 are formed on the opposite surfaces of the anti-shaft-release member 415. The dynamic pressure generating grooves 428 generate dynamic pressure when the anti-shaft-release member 415 is rotatably supported in the space of the space-forming member 413.

The space-forming member 413 is typically made of metal such as brass or stainless steel or resin such as LCP, polyamide or polyimide for the purpose of accurately produce a gap around the anti-shaft-release member 415. The holding member 420 is typically made of resin such as LCP, nylon, polyamide, polyimide or Teflon (tradename). The holding member 420 is a seamless member except the gap S.

The above described anti-shaft-release member 415 operates to prevent the shaft 400 from slipping away from the radial bearing 430 in the E direction shown in FIG. 10. However, the anti-shaft-release member 415 takes not only the role of preventing the shaft 400 from slipping away but also the role of a hydrodynamic fluid bearing type thrust bearing means that is provided with dynamic pressure generating groove 428.

Dynamic pressure generating grooves 480 may be formed on the inner peripheral surface of the radial bearing 430. However, dynamic pressure generating grooves 480 may alternatively be formed on the outer peripheral surface 462 of the shaft 400 instead of the inner peripheral surface of the radial bearing 430.

Dynamic pressure generating groove 428 may be formed not only on the opposite surfaces of the anti-shaft-release member 415 but also on the inner end section 431 of the radial bearing 430 and on the inner end surface section 414 of the space-forming member 413.

The anti-shaft-release member 415 is typically made of stainless steel and may be formed completely integrally with the shaft 400 or prepared separately from the shaft 400. While the shaft 400 is typically made of stainless steel, it may alternatively be formed by outsert molding, using resin such as LCP, polyamide, polyimide or PC (polycarbonate).

The bearing unit 490 of FIG. 10 can easily adopt a hydrodynamic bearing structure both radially and in the thrusting direction. Therefore, the bearing unit 490 of FIG. 10 can be more reliable and enjoy a longer service life if compared with the bearing unit 90 of FIG. 8.

Figure 11:
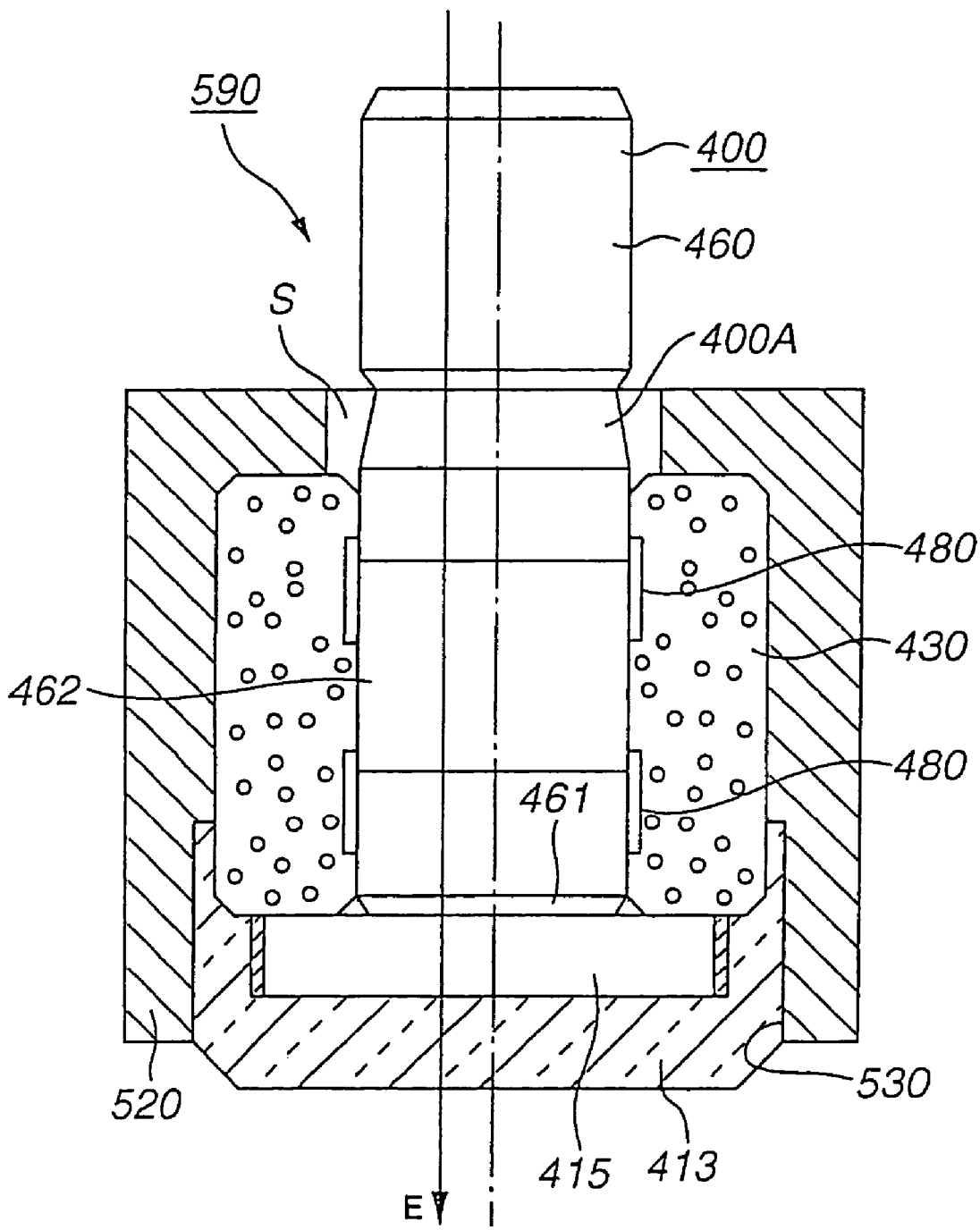
FIG. 11 is a schematic cross sectional view of still another embodiment of bearing unit according to the invention.

FIG. 11 is a schematic cross sectional view of still another embodiment of bearing unit according to the invention.

The bearing unit 590 of FIG. 11 has a configuration substantially same as the bearing unit 490 of FIG. 10. Therefore, the components of the bearing unit 590 of FIG. 11 that are same as or similar to their counterparts of the bearing unit 490 of FIG. 10 are denoted respectively by the same reference symbols and will not be described in detail.

The bearing unit 590 of FIG. 11 differs from the bearing unit 490 of FIG. 10 in terms of the profile of the holding member 520, the role of the anti-shaft-release member 415 and that of the space-forming member 413.

The holding member 520 has a gap S and another opening 530. The space-forming member 413 is exposed to the outside through the opening 530.

The shaft 400 is typically made of an electrically conductive material such as stainless steel. The space-forming member 413 is also typically made of an electrically conductive material such as stainless steel or brass. As pointed out above, the space-forming member 413 is exposed to the outside through the opening 530.

With this arrangement, the static electricity that is generated when the motor shown in FIG. 11 is driven to operate is released to outside and then to the ground by way of the shaft 400, the anti-shaft-release member 415 and the space-forming member 413 as indicated by arrow E in FIG. 11.

Thus, when a bearing unit according to the invention is mounted in a hard disc drive, for instance, and static electricity is generated to show a voltage of 30V, the generated static electricity is released to the outside and then to the ground by way of the above described route. Therefore, it is possible to prevent a phenomenon that the magnetic head arranged in the hard disc drive is broken down by the static electricity.

In this case, lubricating oil is filled in the space among the space-forming member 413, the anti-shaft-release member 415, the outer peripheral section 462 of the shaft 400 and the radial bearing 430. If the lubricating oil filled in the space is electrically conductive, the discharging performance thereof can be improved by the arrangement of this embodiment.

Any of the bearing units 90, 490, 590 shown respectively in FIGS. 8, 10 and 11 can be applied not only to a fan motor 30 as shown FIG. 5 but also to a mechanism for driving an information recording medium in an information recording/reproduction device such as a hard disc drive as described above.

Since a bearing unit according to the invention is provided with a space-forming member, the anti-shaft-release member can be arranged in the inside of the bearing unit, which is compact, then, it is possible to downsize a motor in which such a bearing unit is mounted. Additionally, since the shaft would not slip away in the assembling operation, it is easy to handle the bearing unit. Still additionally, since the holding member that is a seamless member contains all the remaining components of the bearing unit except the part of the shaft projecting to the outside through a small gap formed in the holding member, the lubricating oil in the inside would not leak out. Thus, the bearing unit is highly reliable and can enjoy a long service life.

Furthermore, a motor or some other rotary drive in which a bearing unit according to the invention is mounted can be downsized and is made free from any anti-release member arranged outside the motor so that the rotary drive can be manufactured at low cost with a reduced number of manufacturing steps.

Now, still other embodiments of bearing unit according to the invention will be described below by referring to FIGS. 12A through 13D.

Each of these embodiments, which are described below, is provided with a radial bearing means and a thrust bearing means as bearing means for supporting a shaft or a rotary shaft. The thrust bearing means arranged at an end section of the shaft may be of the pivot type or the hydrodynamic fluid bearing type.

FIG. 12A is a schematic cross sectional view of an embodiment of bearing unit that comprises a radial bearing means and a thrust bearing means. In this embodiment, the front end section of the shaft is processed to show a spherical profile and the thrust bearing means is formed by a member made of a polymeric material to receive the front end section of the shaft.

The bearing unit 201 comprises a shaft 202 formed by a metal material such as stainless steel or a resin material and showing a round rod-shaped profile and a bearing means 203 for supporting the shaft 202. In other words, a radial bearing means 204 for receiving a radial load and a thrust bearing means 205 for receiving a thrust load are provided as bearing means 203.

A sintered and oil-impregnated bearing or a hydrodynamic fluid bearing is used for the radial bearing means 204 that rotatably and radially support the shaft 202. As an example, the use of a hydrodynamic fluid bearing will be described below. The bearing is made of sintered metal, which may be a copper type metal or a copper/iron type metal and dynamic pressure generating grooves are formed on it. Lubricating oil is held there by means of the porous structure that is specific to sintered metal. In this embodiment, so-called herring bone grooves having a V-shaped cross section are formed as dynamic pressure generating grooves. Two groups of dynamic pressure generating grooves 204a, 204a, . . . and 204b, 204b, . . . are formed on the inner periphery of the cylindrical radial bearing means 204 and running in the sense in which the shaft revolves to make the radial bearing means 204 operate as hydrodynamic fluid bearing. However, the dynamic pressure generating grooves may alternatively be formed on the peripheral surface of the shaft 202. For the purpose of the invention, not only a hydrodynamic fluid bearing but also a bearing of any of various different types such as a metal bearing may be used.

An annular engaging groove 202a is formed on the shaft 202 at a position close to the front end thereof and engaged with an annular anti-release member 206. The anti-release member 206 is a part typically made of a polymeric material such as nylon (normal chain aliphatic polyamide) or a part made of a metal material and having a form of an E-ring. It operates as stopper for preventing the shaft 202 from axially moving and slipping away when axial external force is applied to the shaft 202 due to vibrations or a pressure change.

A member (to be referred to as "space-forming member" hereinafter) 207 made of a polymeric material such as nylon, polyimide or liquid crystal polymer (LCP) or a metal material such as brass is arranged around the anti-release member 206. The space-forming member 207 is arranged to form a space around the anti-release member 206 in a predetermined manner by considering that the anti-release member 206 is rigidly fitted to the shaft 202 and revolves with the latter.

In this embodiment, the resin made space-forming member 207 is realized in the form of a bottomed hollow cylinder having a recess 207a, while the corresponding end of the shaft 202 is made to show a spherical profile so as to contact the flat bottom of the space-forming member 207 at a point. As for the thrust bearing means 205 for supporting the shaft 202 in the thrusting direction, a member for bearing the corresponding end of the shaft can be eliminated when the end of the shaft is made to show a curved surface and brought into contact with the space-forming member 207. In other words, the space-forming member 207 operates as a bearing member. The profile of the space-forming member is not limited to the above described one. Alternatively, a projection or a bearing section may be integrally formed with the space-forming member and brought into contact with the corresponding end of the shaft.

The space-forming member 207 of this embodiment is additionally provided with a stepped section 207b that operates as receiving recess to be partly engaged with the radial bearing means 204. The reason for providing the space-forming member 207 with a stepped section 207b will become apparent hereinafter in the description of a method of manufacturing a bearing unit according to the invention.

A member 208 for sealing lubricating oil (to be referred to as "seal member" hereinafter) is arranged around the shaft so as to produce a minute radial gap G between the inner peripheral surface 208a thereof and the shaft 202 at a position near the exposed part of the shaft 202. The seal member 208 has a hollow cylindrical profile and is typically made of a polymeric material such as nylon or polytetrafluoroethylene or a metal material. The seal member 208 is provided with a stepped section 208b. The stepped section 208b operates as receiving recess to be partly engaged with the radial bearing means 204. The reason for providing the seal member 208 with a stepped section 208b will become apparent hereinafter in the description of a method of manufacturing a bearing unit according to the invention. A part 209 of the lubricating oil that is filled in the bearing unit is found in the gap G as seen from FIG. 12B. The seal member 208 is provided with recesses 208c that correspond to the respective projections formed on the corresponding end facet of the radial bearing means 204 and is adapted to define the axial direction of the radial bearing means 204.

The housing member or the holding member 210 is used to hold the space-forming member 207, the seal member 208 and the radial bearing means 204 from the outer peripheral side of the bearing unit. It is typically made of a resin material, or a polymeric material such as polyimide, polyamide, nylon or LCP. In this embodiment, the housing member 210 takes the role of binding the radial bearing means 204, the space-forming member 207 and the seal member 208 together seamlessly without any gap. Thus, it is possible to prevent lubricating oil from leaking.

In this embodiment, a special arrangement is devised to prevent lubricating oil from leaking from the part of the shaft 202 exposed to the outside.

More specifically, as shown in FIG. 12B in an enlarged scale, a part 202c of the shaft 202 that is located close to the part thereof exposed to the outside and adapted to form the gap G with the seal member 208 is tapered. The diameter of the tapered part 202c of the shaft 202 increases as it comes close to the inside of the bearing unit or the radial bearing means 204 along the shaft 202.

Thus, since the gap G is formed between the tapered section 202c whose diameter increases toward the inside of the bearing unit and the inner peripheral surface 208a of the seal member 208 arranged vis-à-vis the tapered section 202c, the gap is reduced as it comes close to the inside of the bearing unit. If the drawing pressure that is generated by the capillary phenomenon is "p", it is expressed by the formula of "$p=2\gamma\cos\theta/c$" (where $\gamma$: the surface tension of lubricating oil, $\theta$: the contact angle of lubricating oil, c: gap). In other words, p is inversely proportional to the gap dimension $c (p \propto 1/c)$. Thus, the smaller the gap dimension c, the larger the drawing pressure becomes so that the lubricating oil 209 in the gap dimension c is drawn to the inside of the bearing unit because the gap dimension c becomes smaller as it comes close to the inside. Therefore, lubricating oil 209 would not leak out. When the shaft has a constant diameter, the gap is differentiated when the shaft becomes eccentric relative to the opening of the holding member and lubricating oil is urged to move to an area where the gap is small. However, when the shaft is provided with a tapered section 202c, the gap is made to vary along the axial direction and an elliptic cross section of the gap that is inclined relative to the shaft always shows areas with a same clearance so that lubricating oil would be biased least if eccentricity takes place. Additionally, the centrifugal force that is generated as the shaft is driven to revolve provides a sealing effect that prevents lubricating oil from dispersing to the outside.

Lubricating oil will be prevented from leaking further when a surface active agent is applied to the exposed part of the shaft 202 and the surface of the seal member 208. The contact angle $\theta$ of the shaft and lubricating oil is increased when a surface active agent is applied to the shaft. As a result, the drawing pressure p is reduced. As the external drawing pressure p is reduced, the internal drawing pressure p is raised relatively to prevent lubricating oil from leaking and otherwise moving.

Now, a method of manufacturing a bearing unit according to the invention will be described by referring to FIGS. 13A through 13D, which illustrate different steps of the process of assembling a bearing unit 201 according to the invention. The bearing unit manufacturing method comprises the following steps:

(1) a shaft insertion step;
(2) a step of fitting a space-forming member and a seal member;
(3) a housing member forming step; and
(4) a step of filling lubricating oil and regulating the amount of lubricating oil.

Figure 13A:
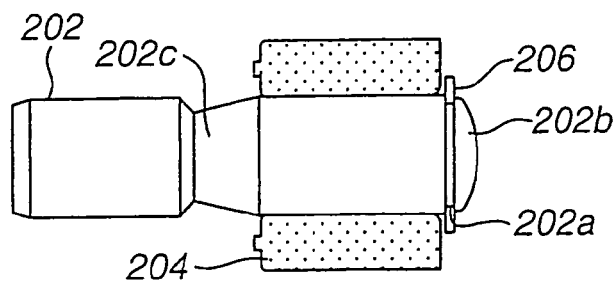
FIGS. 13A through 13D are schematic cross sectional views of the embodiment of bearing unit of FIGS. 12A and 12B, showing assembling steps thereof.

Firstly, in step (1) illustrated in FIG. 13A, a shaft 202 to which an anti-release member 206 is fitted is inserted into a radial bearing means 204. Then, in step (2) illustrated in FIG. 13B, a space-forming member 207 and a seal member 208 are fitted to the radial bearing means 204. More specifically, as the stepped section 207b of the space-forming member 207 and the stepped section 208b of the seal member 208 are respectively fitted to the outer peripheral edges of the corresponding end sections of the radial bearing means 204, the related parts of the radial bearing means 204 are received respectively in the corresponding recess of the space-forming member 207 and that of the seal member 208.

When the operation of this step is completed, the shaft 202 is already in a state where it is rotatably supported by the bearing means 203.

Figure 13B:
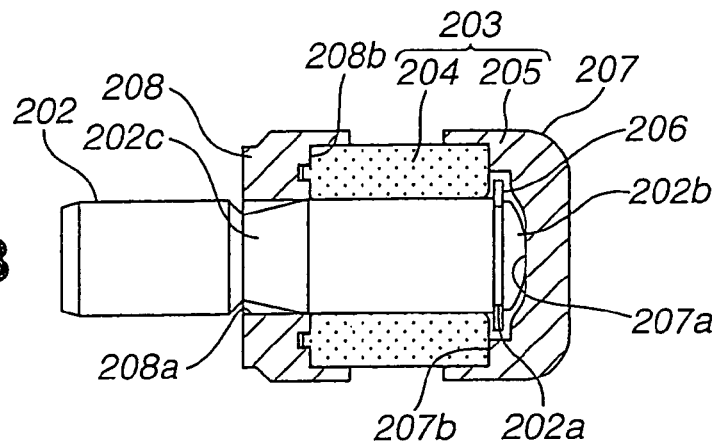
Figure 13C:
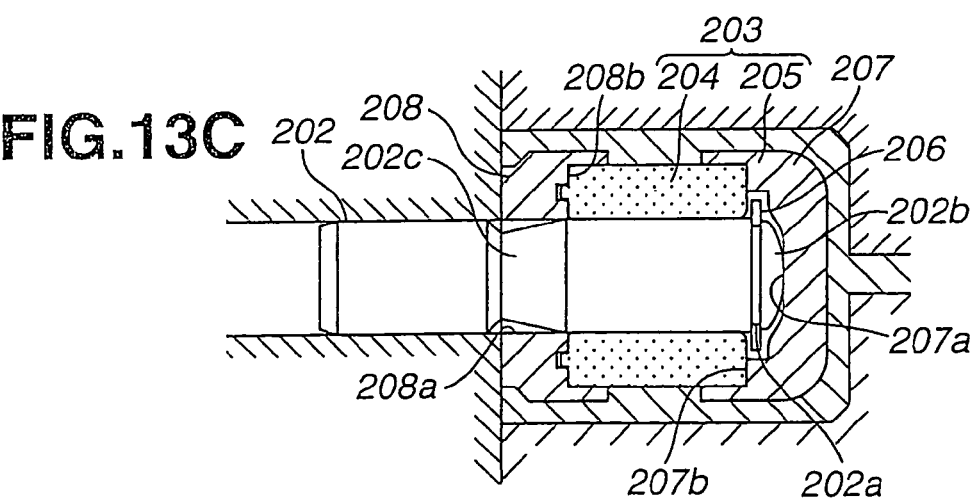

Then, in step (3) illustrated in FIG. 13C, a housing member 210 is formed by outsert molding, using a polymeric material such as nylon.

Figure 13D:
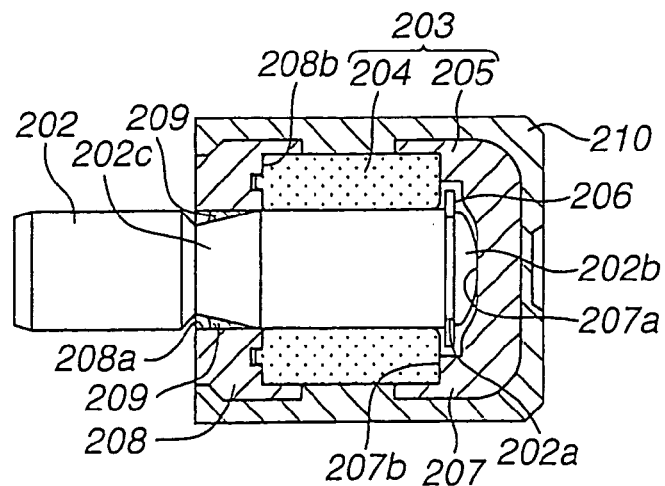

Thereafter, in step (4) illustrated in FIG. 13D, lubricating oil is filled in the inside of the bearing unit by vacuum impregnation and the amount of lubricating oil is regulated. For example, lubricating oil is partly forced out and removed by thermal expansion below a predetermined temperature level.

In the bearing unit 201 that is prepared in the above described manner, the radial bearing means 204, the space-forming member 207 and the seal member 208 are bound together as the seamless housing member 210 is formed by outsert molding so that no gap is left among these members and lubricating oil is completely prevented from leaking. It is no longer necessary to control the packing operation that is conventionally required for the binding section of the related members so that the process management is simplified.

While the seal member 208 may be molded in step (2) shown in FIG. 13B, it is preferable to prepare the seal member 208 in advance and fit it to the radial bearing means 204 when the gap between the seal member and the shaft is small for the purpose of raising the accuracy of the gap. If, for example, the gap dimension c is made greater than the specified value beyond a tolerance, the drawing pressure p generated by the capillary force becomes too small. In other words, the gap is subjected to an upper limit. Therefore, when a large amount of lubricating oil is required, the axial length of the gap G needs to be increased. Then, a technically difficult process may be required to prepare the metal mold because the part of the metal mold to be used for forming the gap G comes to have a thin and axially long profile. If the molding accuracy is not sufficient, the gap dimension can show large variances. To the contrary, when the seal member is prepared before step (2) illustrated in FIG. 13B, it can show a satisfactory level of accuracy and hence the gap can also be produced accurately. Since the impact-resistance is inversely proportional to the square of the gap dimension c, lubricating oil is prevented from dispersing by reducing the gap dimension and its variance. However, it should be noted here that, as the gap dimension is reduced, the level of the surface of lubricating oil can move significantly as the oil temperature rises and the lubricating oil in the inside expands.

Figure 14:
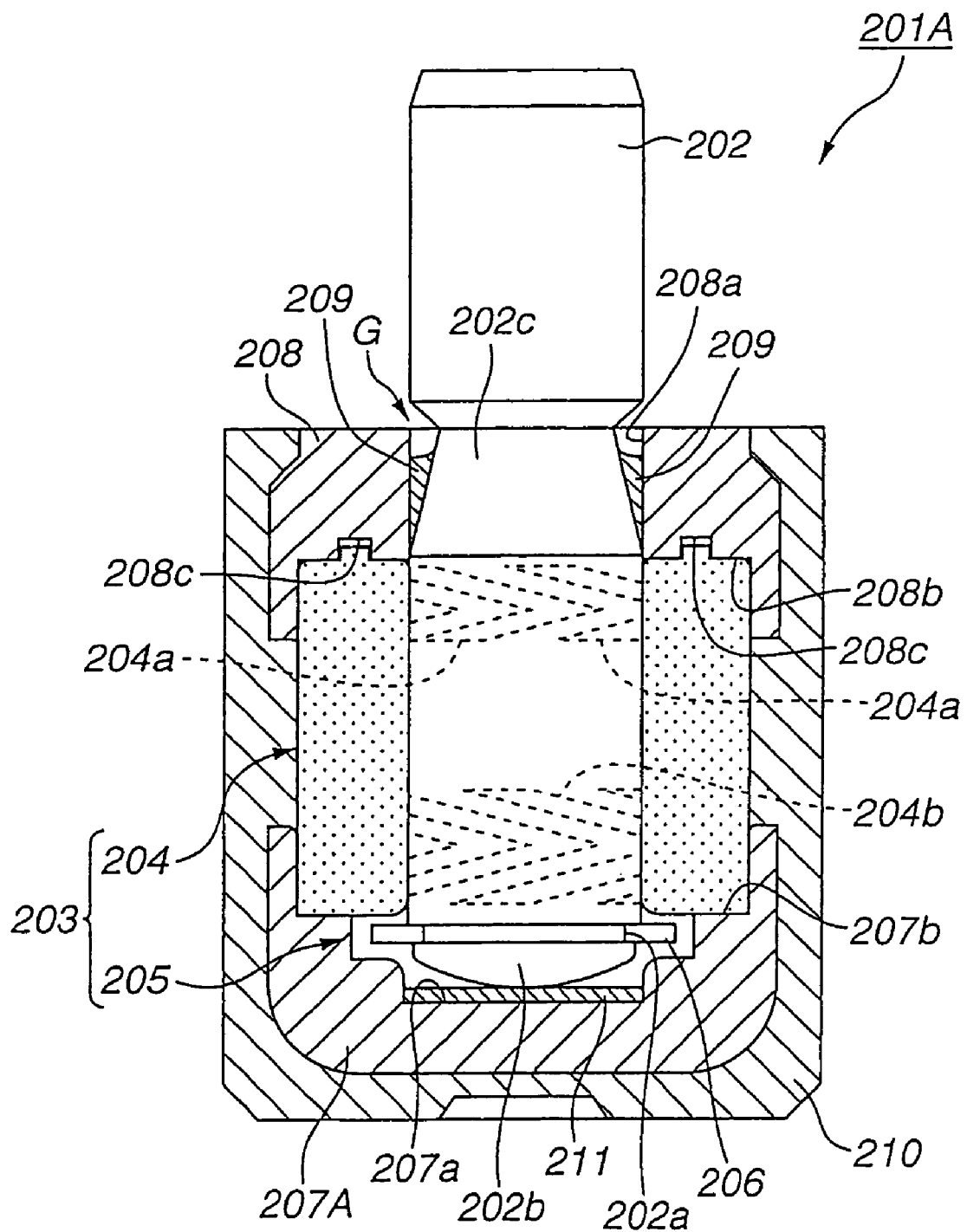
FIG. 14 is a schematic cross sectional view of still another embodiment of bearing unit according to the invention.

The space-forming member of the bearing unit may be made of a metal material instead of a synthetic resin material as shown in FIG. 14.

The bearing unit 201A illustrated in FIG. 14 differs from the above-described bearing unit 201 in a manner as described below. Note that, in the following description, the components of the bearing unit 201A that are same as or similar to their counterparts of the bearing unit 201 are denoted respectively by the same reference symbols and would not be described in detail.

In the bearing unit 201A illustrated in FIG. 14, the space-forming member 207A is typically made of stainless steel, brass, a pressed material or a sintered material and the thrust bearing means 205 has a thrust bearing member 211 for receiving the corresponding shaft end 202b that is processed to show a spherical profile. The thrust bearing member 211 is arranged in and fitted to a recess 207a formed in the space-forming member 207A. The thrust bearing member 211 is made of a resin material such as nylon, polyimide, polyamide or liquid crystal polymer or a low friction material such as rubidium and formed separately from the space-forming member 207A.

Since the space-forming member 207A of the bearing unit 201A is made of metal, a thrust bearing member 211 that is made of a resin material or a low friction material is provided in view of prolonging the service life of the bearing unit 201A. Thus, the requirements to be met in the step of outsert molding of the housing member 210 that follows the step of fitting the space-forming member 207A including the temperature and the pressure of injecting resin are alleviated by the arrangement of raising the rigidity and the resistance to high temperatures of the space-forming member 207A. Differently stated, while the cost of this embodiment of bearing unit can be raised due to the provision of the thrust bearing member 211, it is possible to reduce the overall cost because no particular requirements are imposed for the selection of resin material and the molding requirements are alleviated.

Now, still another embodiment of bearing unit according to the invention will be described by referring to FIG. 15. The bearing unit 201B of this embodiment differs from the bearing unit 201 illustrated in FIG. 12A in that the end section of the shaft shows a T-shaped profile in a lateral view and the thrust bearing means, which is a hydrodynamic fluid bearing, is formed by utilizing the anti-shaft-release member. Therefore, the components of the bearing unit 201B that are same as or similar to their counterparts of the bearing unit 201 are denoted respectively by the same reference symbols and will not be described in detail.

Figure 15:
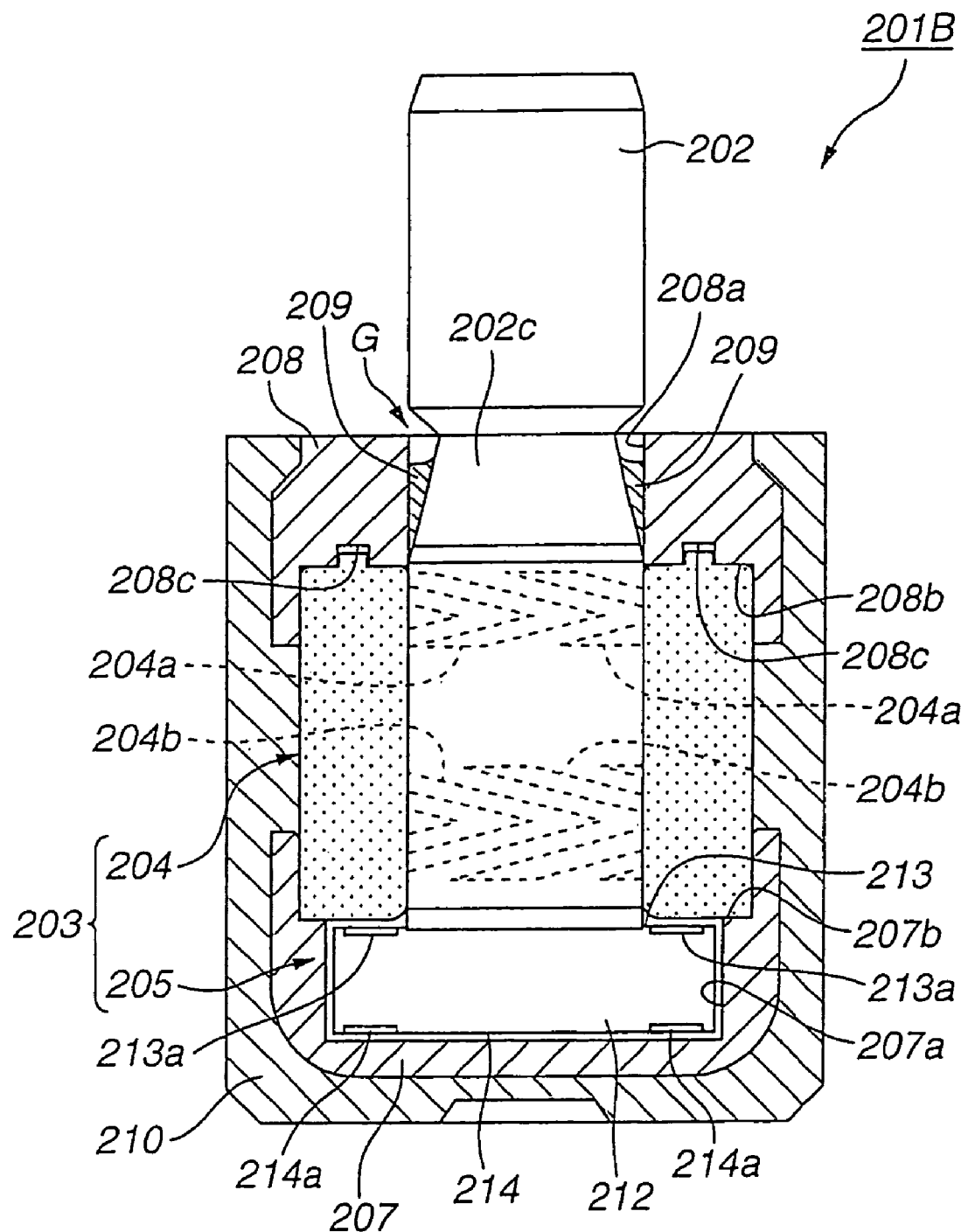
FIG. 15 is a schematic cross sectional view of still another embodiment of bearing unit according to the invention.

Of the bearing unit 201B illustrated in FIG. 15, the anti-release member 212 arranged at the front end of the shaft 202 has a disc-shaped profile with a predetermined thickness and is made of a metal material such as brass or stainless steel or a polymeric material such as nylon or LCP. The anti-release member 212 is provided on the opposite end facets thereof including the facet 213 disposed vis-à-vis the radial bearing means 204 and the facet 214 disposed vis-à-vis the space-forming member 207 with respective groups of dynamic pressure generating grooves 213a, 213a, . . . and dynamic pressure generating grooves 214a, 214a, . . . .

The space-forming member 207 is additionally provided with a recess 207a for receiving the anti-release member 212 so that a space is formed around the anti-release member 212. Lubricating oil is filled in the gap formed between the anti-release member 212 and the space-forming member 207 and the gap formed between the anti-release member 212 and the radial bearing means 204.

Thus, the bearing unit 201B shows the configuration of a hydrodynamic fluid bearing realized by using the anti-release member 212 and the space-forming member 207 for the thrust bearing means 205 and the shaft 202 is rotatably supported relative to the hydrodynamic fluid bearing. Therefore, the bearing unit 201B is relatively free from vibrations and hence can suitably find applications to motors of recording devices such as optical disc drives and hard disc drives.

While the manufacturing method comprising steps (1) through (4) described above by referring to FIGS. 13A through 13D can also be used basically for manufacturing the bearing unit 201B, it should be noted that it is necessary to supply lubricating oil into the dynamic pressure generating grooves 213a and 214a and the space between the radial bearing means 204 and the space-forming member 207 in order to generate dynamic pressure to a predetermined level when the shaft is driven to revolve. How lubricating oil is supplied is defined by the dimensional accuracy of the anti-release member 212 and the space-forming member 207.

While the dynamic pressure generating grooves 213a, 214a are formed in the anti-release member 212 in this embodiment, the arrangement of dynamic pressure generating grooves are not limited to the above description and they may alternatively be formed on the surface of the radial bearing means 204 that is located vis-à-vis the anti-release member 212 or the surfaces of the space-forming member 207 located vis-à-vis the anti-release member 212.

Now, a rotary drive according to the invention will be described below.

Figure 16:
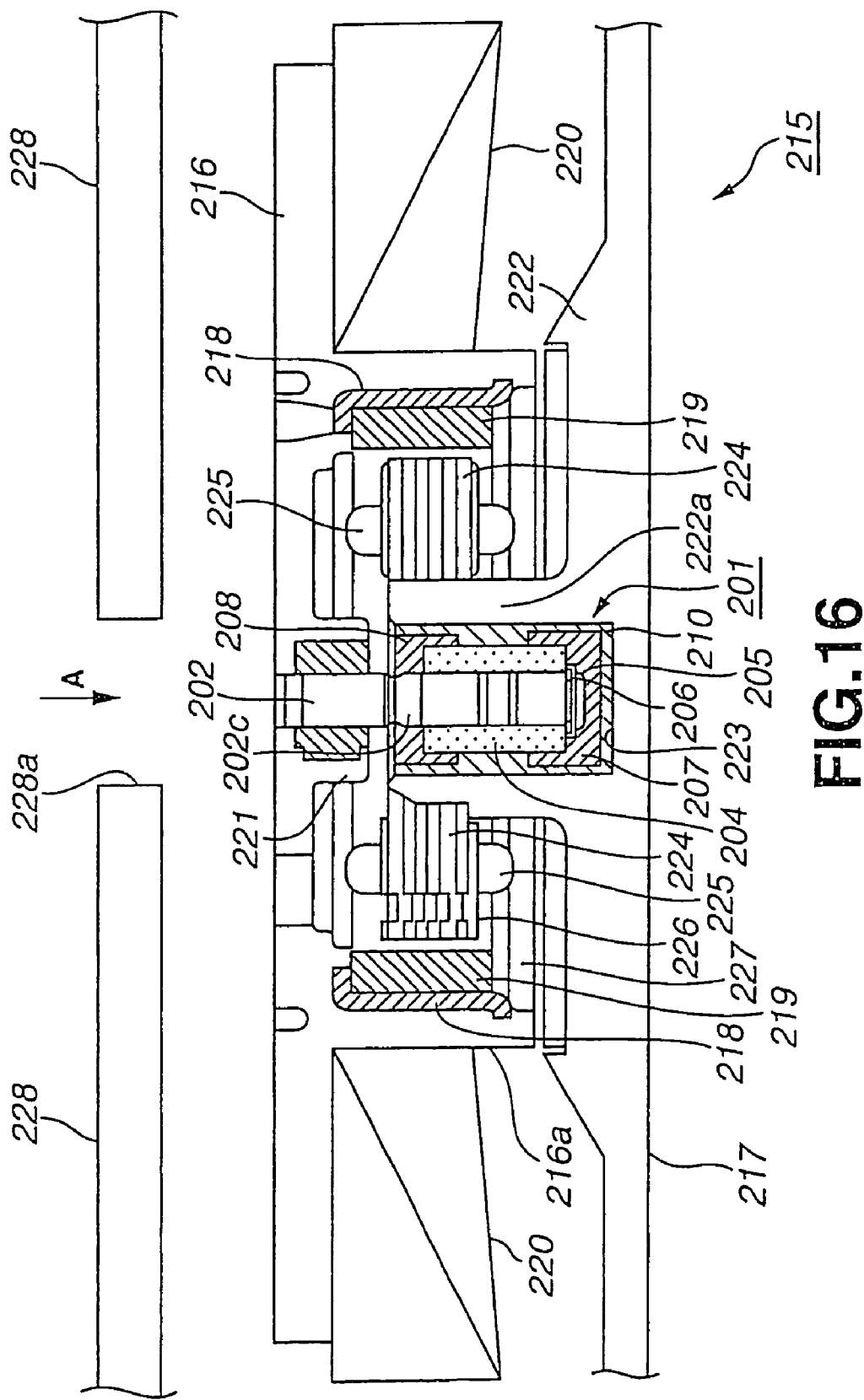
FIG. 16 is a schematic cross sectional view of an embodiment of rotary drive according to the invention and comprising a bearing unit according to the invention.

FIG. 16 is an embodiment of rotary drive comprising a bearing unit 201 according to the invention that is applied to a fan motor. It may be appreciated that the bearing unit 201 may be replaced by a bearing unit 201A or bearing unit 201B.

Referring to FIG. 16, the rotary drive 215 comprises a rotor section 216 and a stator section 217 that includes the bearing unit 201.

The rotor section 216 that operates as rotary body (rotor) is provided with a rotor yoke 218, a magnet 219, a plurality of blades 220, 220, . . . and an end of a shaft 202 that operates as rotary shaft is rigidly press-fitted and secured to the a boss section 221 arranged at the center of rotation of rotor section 216. The annular magnet (plastic magnet) 219 that is magnetized along the periphery thereof is bonded and secured to the inner peripheral surface of the rotor yoke 218 and the plurality of blades 220, 220 . . . is arranged peripherally on the outer peripheral surface of the cylindrical section 216a of the rotor section 216 at predetermined regular angular intervals.

The bearing unit 201 is arranged in the stator section 217 as a shaft supporting means for rotatably supporting the shaft 202 that revolves with the rotor section 216. More specifically, the bearing unit 201 is received in a recess 223 of a cylindrical support section 222a that is formed in a stator yoke 222 of the stator section 217. It is press-fitted or bonded to the recess 223. Coil sections 226, each of which includes a core 224 and coil 225, are arranged at respective positions located vis-à-vis the inner peripheral surface of the magnet 219 to form a rotary body drive means 227 along with the magnet 219 and the rotor yoke 218.

The rotary drive 215 has a case 228, which is provided with a hole 228a. As the coil sections 226 are electrically energized to drive the rotor section 216 to revolve, air flows in through the hole 228a as indicated by arrow A in FIG. 16 and then expelled to the outside through a blast nozzle (not shown) formed in the case 228.

As a fan motor as described above mounts the bearing unit 201, lubricating oil would not leak out to improve reliability and prolong the service life of the bearing unit 201. Additionally, when a hydrodynamic fluid bearing type radial bearing means 204 is used, lubricating oil is further prevented from leaking to realize a motor that is highly reliable and adapted to revolve at a high rate. Therefore, such a bearing unit can suitably be used in a device as a cooling fan that is required to show a high cooling performance. For example, a bearing unit according to the invention may find applications in cooling systems for cooling a heat emitting body such as a CPU of a computer, where heat generated from the heat emitting body is transmitted to a heat sink and the heat sink is cooled by air blow by a fan.

The posture of arrangement of the rotary drive 215 does not give rise to any problem in terms of the direction of the shaft 202. For example, the rotary drive 215 may be arranged upside down relative to the posture shown in FIG. 16. In short, the rotary drive 215 is not subjected to significant restrictions in terms of positional arrangement.

A rotary drive according to the invention can find applications including not only fan motors but also motors of rotary drives of disc-shaped recording mediums and various other electric devices such as rotary head drums.

As described above, a bearing unit according to the invention is so configured that, after fitting a space-forming member, a seal member and other necessary members to the rotary shaft support means, which may be a radial bearing, the members are contained in and surrounded by a housing member, which has a seamless structure and made of a polymeric material, without producing any gap in the inside. Therefore, the bearing unit is free from the problem of leakage of lubricating oil from the inside. Thus, the present invention provides a bearing unit that is highly reliable and can enjoy a long service life.

Additionally, a bearing unit according to the invention is manufactured by a simple manufacturing method that comprises only a reduced number of steps and it is not necessary to control the packing operation, using an adhesive agent, and the operation of checking the sealed condition of the bearing unit.

Still additionally, a bearing unit according to the invention is manufactured highly reliably at low cost and can enjoy a long service life due to the use of a hydrodynamic fluid bearing made of sintered metal and a molded housing member made of resin.

Furthermore, a bearing unit according to the invention can provide a necessary level of accuracy even when the gap between the seal member and the shaft is relatively small and reduce the deviation of the gap G.

Figure 17:
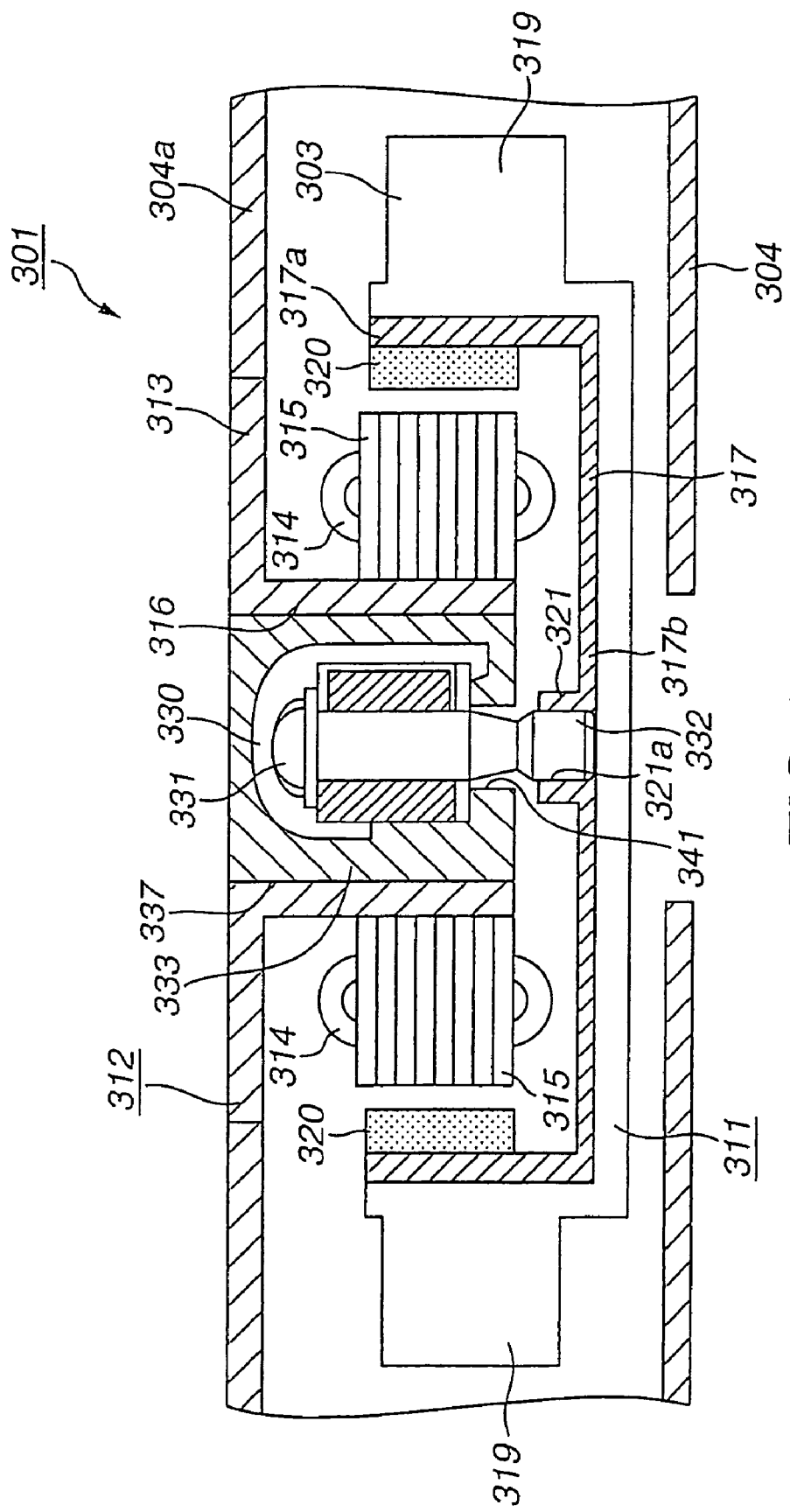
FIG. 17 is a schematic cross sectional view of another embodiment of rotary drive according to the invention, which is a motor, and comprising a bearing unit according to the invention.

Now, still other embodiments of bearing unit according to the invention and those of rotary drive using a bearing unit according to the invention will be described below by referring to the related drawings (FIG. 17).

The following embodiments will be described in terms of motors to be used for heat-emitting devices of electric apparatus such as portable computers, or information processing apparatus for processing various kinds of information. A portable computer is provided in the inside thereof with a heat-emitting device. The heat-emitting device comprises a metal made base, a motor 301 fitted to the base, a fan 303 driven to revolve by the motor 301, a fan case 304 containing the fan 303 in the inside and a heat sink. The motor 301 for driving the fan 303 of the heat-emitting device to revolve will be described in detail below.

The motor 301 that is provided with a bearing unit 330 according to the invention comprises a rotor 311 and a stator 312 as shown in FIG. 17.

The stator 312 is arranged on and integrally formed with the upper plate 304a of the fan case 304, which contains the motor 301 and the fan 303 that is driven to revolve by the motor 301. The stator 312 has a bearing unit 330 according to the invention, coils 314 and cores 315 around which the coils 314 are wound respectively. The stator yoke 313 may be integrally formed with the upper surface section 304a of the fan case 304. In other words, they may be formed as part of the fan case 304 or separately from the fan case 304. The stator yoke 313 is typically made of iron. The bearing unit 330 is rigidly secured to the inside of the hollow cylindrical holder 316 that is formed at the center of the stator yoke 313 by press-fitting and/or bonding.

The holder 316 into which the bearing unit 330 is press-fitted is formed integrally with the stator yoke 313 to show a hollow cylindrical profile.

The cores 315, around which the respective coils 314 are wound, are fitted to the outer periphery of the holder 316 that is integral with the stator yoke 313. A drive current is supplied to the coils 314.

The rotor 311 that forms the motor 301 along with the stator 312 is fitted to the rotary shaft 331 that is rotatably supported by the bearing unit 330 so that it revolves with the rotary shaft 331. The rotor 311 comprises a rotor yoke 317 and a fan 303 having a plurality of blades 319 that revolve integrally with the rotor yoke 317. The blades 319 of the fan 303 is integrally formed with the rotor yoke 317 on the outer peripheral surface of the rotor yoke by outsert molding.

A rotor magnet 320 is arranged on the inner peripheral surface of the cylindrical section 317a of the rotor yoke 317 so as to face the coils 314 of the stator 312. The magnet 320 is a plastic magnet that is so magnetized as to show S poles and N poles that are alternately and peripherally arranged and rigidly fitted to the inner peripheral surface of the rotor yoke 317 by means of an adhesive agent.

The rotor yoke 317 is made to revolve integrally with the rotary shaft 331 as the fitting section 332 formed at the front end of the rotary shaft 331 that is supported by the bearing unit 330 is press-fitted into the boss section 321 of the plate section 317b that is provided at the center thereof with a through hole 321a.

As a drive current is supplied to the coils 314 of the stator 312 with a predetermined energizing pattern from a drive circuit section arranged outside relative to the motor 301, the rotor 311 of the motor 301 having the above described configuration is driven to revolve with the rotary shaft 331 under the effect of the magnetic fields generated in the respective coils 314 and the magnetic field produced from the rotor magnet 320 of the rotor 311. As the rotor 311 revolves, the fan 303 having a plurality of blades 319 and fitted to the rotor 311 also revolves with the rotor 311. As the fan 303 revolves, air is drawn in from the outside of the computer device through the opening cut through the cabinet of the computer and made to flow into the cabinet so as to pass through the heat sink arranged in the cabinet before it is expelled to the outside of the cabinet through a through hole also cut through the cabinet so that the heat generated by the heat emitting element is discharged to the outside of the computer main body and cool the computer main body.

Now, the bearing unit 330 that is used in the motor 301 will be described in greater detail below.

Figure 18:
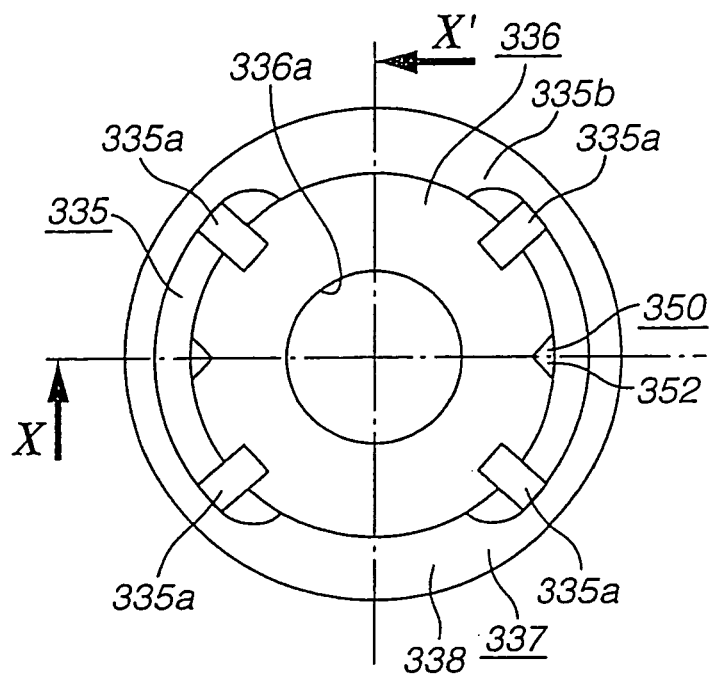
FIG. 18 is a schematic cross sectional view of an embodiment of bearing unit according to the invention taken along line Y-Y' in FIG. 19.
Figure 19:
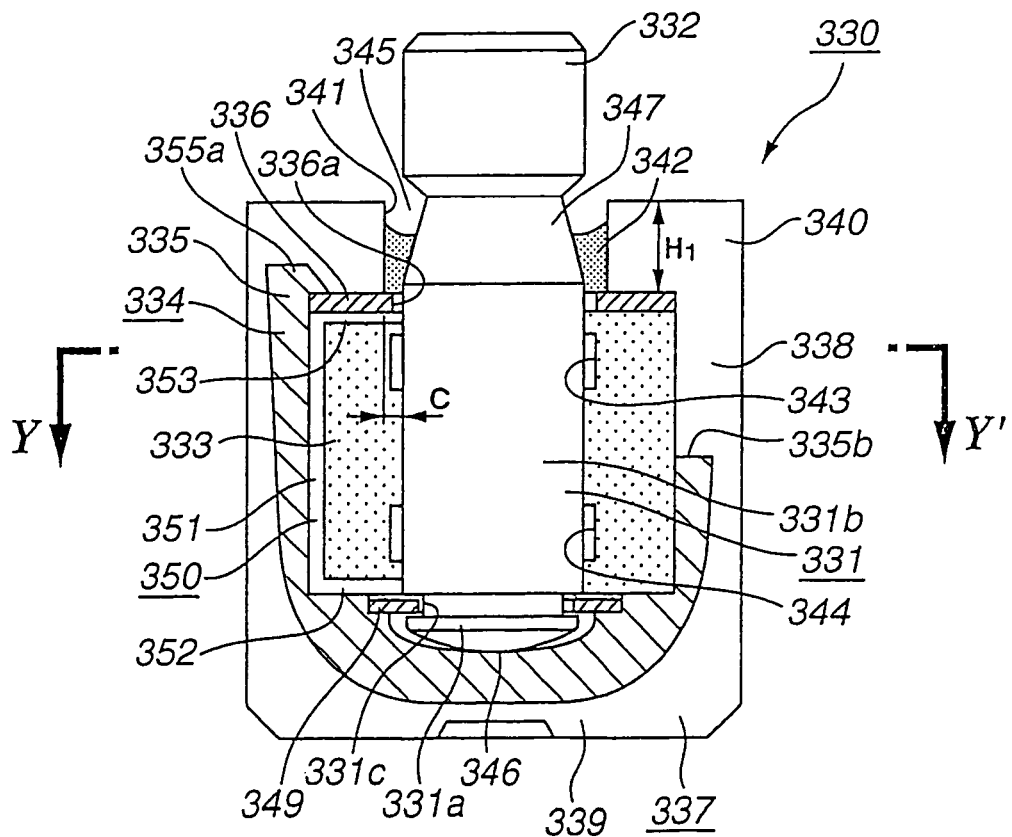
FIG. 19 is a schematic cross sectional view of the embodiment of FIG. 18 taken along line X-X' in FIG. 18.

As shown in FIGS. 17, 18 and 19, the bearing unit 330 that rotatably supports the rotary shaft 331 of the above described motor 301 comprises a radial bearing 333 for peripherally supporting the rotary shaft 331, a space-forming member 334 formed outside the radial bearing 333, a housing 337 containing the space-forming member 334 and a communication passage way 350 formed between the space-forming member 334 and the radial bearing 333.

The radial bearing 333 is made of sintered metal and has a hollow cylindrical profile. The radial bearing 333 forms a hydrodynamic fluid bearing along with the lubricating oil 342 filled in the housing 337, which lubricating oil 342 is viscous fluid. Dynamic pressure generating grooves 343, 344 are formed on the inner peripheral surface of the radial bearing 333 for receiving the rotary shaft 331.

Figure 20:
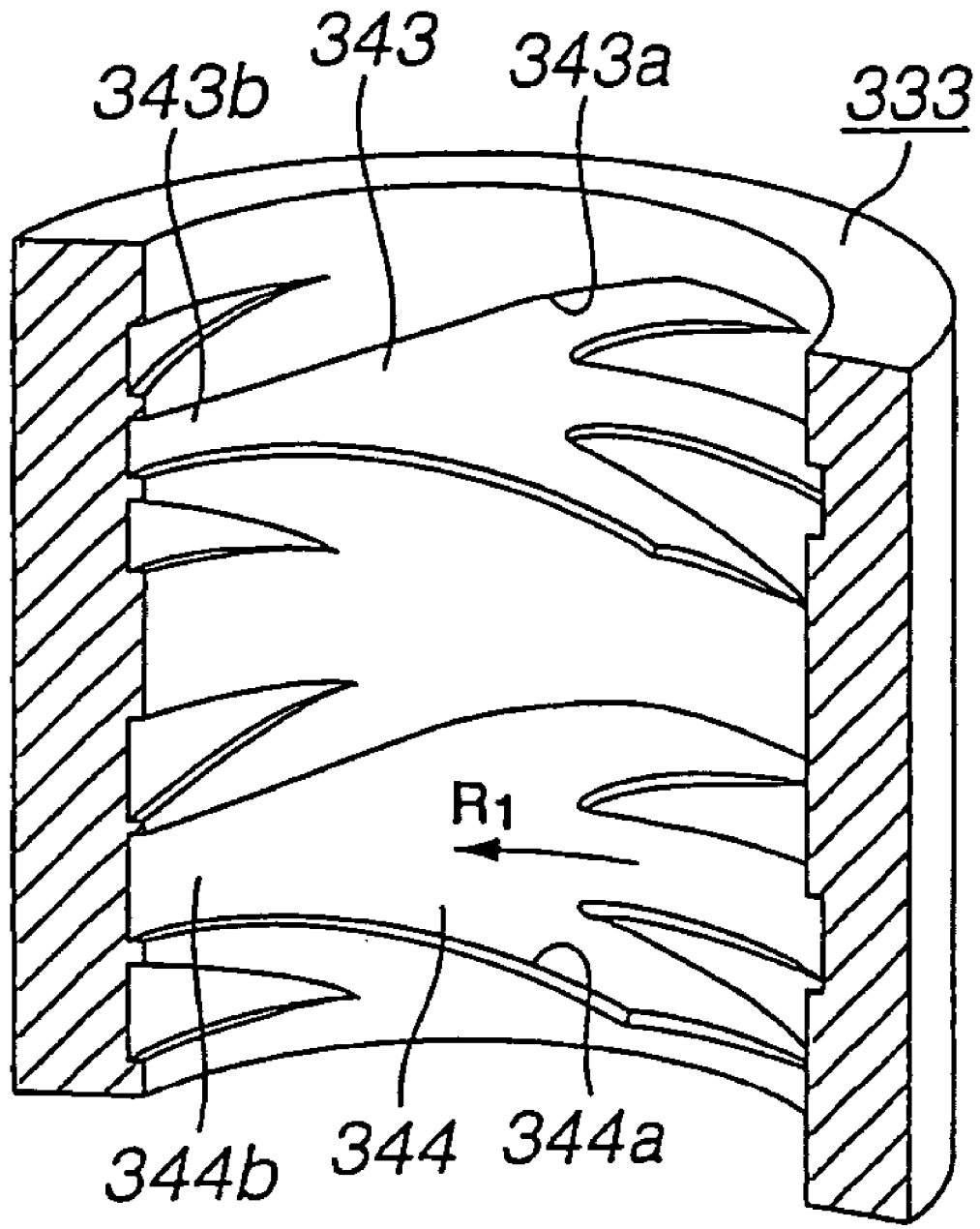
FIG. 20 is a schematic perspective view of dynamic pressure generating grooves formed on the inner peripheral surface of the radial bearing of a bearing unit according to the invention.

As shown in FIG. 20, the dynamic pressure generating grooves 343, 344 include respective pairs of grooves 343a, 344a that are formed on the inner peripheral surface of the radial bearing 333 so as to show V-shapes and linked together respectively by link grooves 343b, 344b that run peripherally. The dynamic pressure generating grooves 343, 344 are arranged in such a way that the front ends of the pairs of grooves 343a, 344a that show V-shapes are directed in the direction of revolution R1 of the rotary shaft 331. In this embodiment, the dynamic pressure generating grooves 343, 344 are arranged in parallel with each other and one above the other in the axial direction of the cylindrical radial bearing 333, of which the dynamic pressure generating grooves 343 are located at the open side of the shaft, or close to the exposed part of the shaft, while the dynamic pressure generating grooves 344 are located at the closed side of the shaft or close to thrust bearing, which will be described hereinafter. The number and the size of the dynamic pressure generating grooves 343 and those of the dynamic pressure generating grooves 344 may be selected appropriately depending on the size and the length of the radial bearing 333. The radial bearing 333 may be made of brass, stainless steel or a polymeric material.

As the rotary shaft 331 inserted into the radial bearing 333, which is formed as hydrodynamic fluid bearing, is driven to revolve continuously around the central axis CL in the direction of R1 in FIG. 20, the lubricating oil 342 filled in the housing 337 flows through the dynamic pressure generating grooves 343, 344 to generate dynamic pressure between the outer peripheral surface of the rotary shaft 331 and the inner peripheral surface of the radial bearing 333 to support the revolving rotary shaft 331. The dynamic pressure that is generated at this time minimizes the coefficient of friction between the rotary shaft 331 and the radial bearing 333 to make the rotary shaft 331 revolve very smoothly.

Meanwhile, in the bearing unit 330, the width of the dynamic pressure generating grooves 344 as viewed in the thrusting direction is made greater than the width of the dynamic pressure generating grooves 343 as viewed in the thrusting direction. With this arrangement, the dynamic pressure P343 generated in the dynamic pressure generating grooves 343 at the open end side of the shaft and the dynamic pressure P344 generated in the dynamic pressure generating grooves 344 at the closed end side of the shaft show a relationship of P343<P344.

The dynamic pressure P344 at the closed end side of the shaft is made greater than the dynamic pressure P343 at the open end side of the shaft for the reason as described below. The generation of the dynamic pressure simultaneously generates change in static pressure. If the dynamic pressure P343 and the dynamic pressure P344 are made to show a relationship of P343>P344 that is inverted from the above relationship, or if the dynamic pressure at the open end side of the shaft is made greater than the dynamic pressure at the closed end side of the shaft, the distribution of static pressure is inverted relative to that of dynamic pressure. Then, the static pressure becomes higher at the closed and sealed end side of the shaft than at the open end side of the shaft. Then, the static pressure that is generated simultaneously with the revolutions of the shaft gives rise to a phenomenon of pushing up the shaft, or a floating shaft phenomenon.

In the bearing unit 330, the width of the dynamic pressure generating grooves 343 is made greater than the width of the dynamic pressure generating grooves 344 to establish a relationship of P343<P344 between the dynamic pressure P343 at the open end side of the shaft and the dynamic pressure P344 at the closed end side of the shaft in order to prevent a floating shaft phenomenon from taking place and make the static pressure at the open end side of the shaft greater than the static pressure at the closed end side of the shaft. In other words, the shaft is drawn toward the closed end side, or toward the side of the thrust bearing, which will be described hereinafter.

The space-forming member 334 that is arranged outside the radial bearing 333 shows a profile adapted to contain and surround the radial bearing 333, which is formed to show a cylindrical profile and is typically made of synthetic resin.

Figure 21:
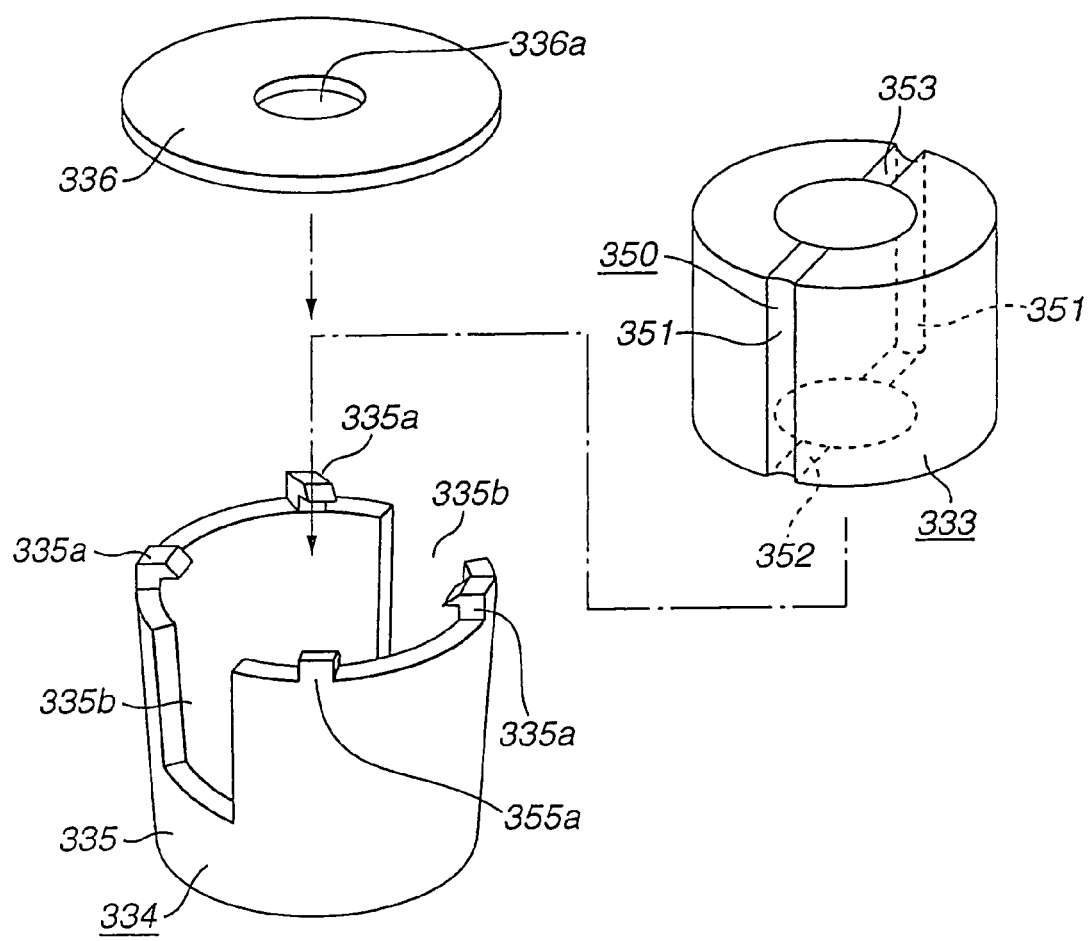
FIG. 21 is a schematic perspective view of a communication passage way that can be formed between the space-forming member and the radial bearing of a bearing unit according to the invention, showing the profile thereof.

As shown in FIGS. 18 and 21, the space-forming member 334 includes a space-forming member main body 335 formed to surround the lateral surface and the bottom surface of the radial bearing and a space-forming member lid section 336 formed to cover the top surface of the radial bearing. The space-forming member lid section 336 is provided at the center thereof with a shaft receiving through hole 336a that allows the rotary shaft 331, which is rotataby supported by the radial bearing 333, to run through it.

A thrust bearing 346 is integrally formed with the space-forming member main body 335 at the center of the inner surface of the bottom thereof. The thrust bearing 346 is adapted to rotatably support the bearing support section 331a of the rotary shaft 331 that is arranged at the closed end of the rotary shaft 331 supported by the radial bearing 333 as viewed in the thrusting direction. The space-forming member 334 is made of synthetic resin and hence the thrust bearing 346 that is integral with the space-forming member 334 is also made of synthetic resin. The thrust bearing 346 is formed as a pivot bearing that supports the bearing support section 331a of the rotary shaft 331 that is made to show a curved or tapered profile at a point.

Claw-like restricting sections 335a are formed at upper parts of the space-forming member main body 335. The claw-like restricting sections 335a are arranged along a circle so as to rigidly secure the space-forming member lid section 336 and make the latter cover the top surface of the radial bearing. Additionally, the space-forming member main body 335 is provided at the lateral wall thereof with openings 335b that allow the outer peripheral surface of the radial bearing to be exposed to the outside when the radial bearing is contained in the space-forming member 334.

While the space-forming member 334 is made of synthetic resin in the above description, it may alternatively be made of metal or a combination of synthetic resin and metal. It is not subjected to any particular limitations in terms of material. When the space-forming member 334 is made of synthetic resin, it is possible to design it in ingenious way particularly in terms of phase index relative to the radial bearing and manufacture it at low cost. Examples of resin materials that can be used to form the space-forming member 334 include fluorine type synthetic resin materials such as polyimide, polyamide and polyacetal, polytetrafluoroethylene Teflon (tradename), nylon, PC (polycarbonate), ABS (acrylonitrilb-utadienestyrene) and other synthetic resin materials.

A communication passage way 350 is formed between the space-forming member 334 and the radial bearing 333. The communication passage way 350 makes the end of the shaft projecting out from the radial bearing 333 in the thrusting direction and the other end of the shaft communicate with each other. In other words, the communication passage way 350 allows the end of the shaft where the thrust bearing 346 is formed and the other end of the shaft that is located at the side of the shaft receiving through hole 336a of the space-forming member lid section 336 to communicate with each other.

Figure 22:
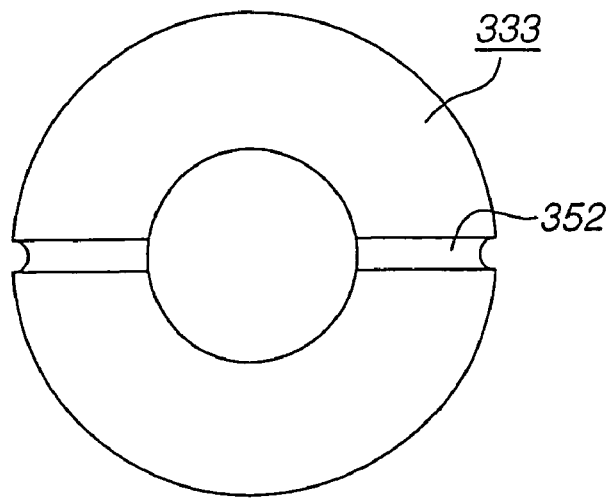
FIG. 22 is a schematic bottom view of second grooves that can be formed on the bottom surface of the radial bearing so as to operate as communication passage way of a bearing unit according to the invention.

As shown in FIGS. 21 and 22, the communication passage way 350 includes a first groove 351 formed on the outer peripheral surface of the radial bearing 333 so as to run in the thrusting direction, a second groove 352 formed on the end facet of the radial bearing 333 located close to the thrust bearing 346 and a third groove 353 formed on the opposite end facet of the radial bearing 333.

Figure 23:
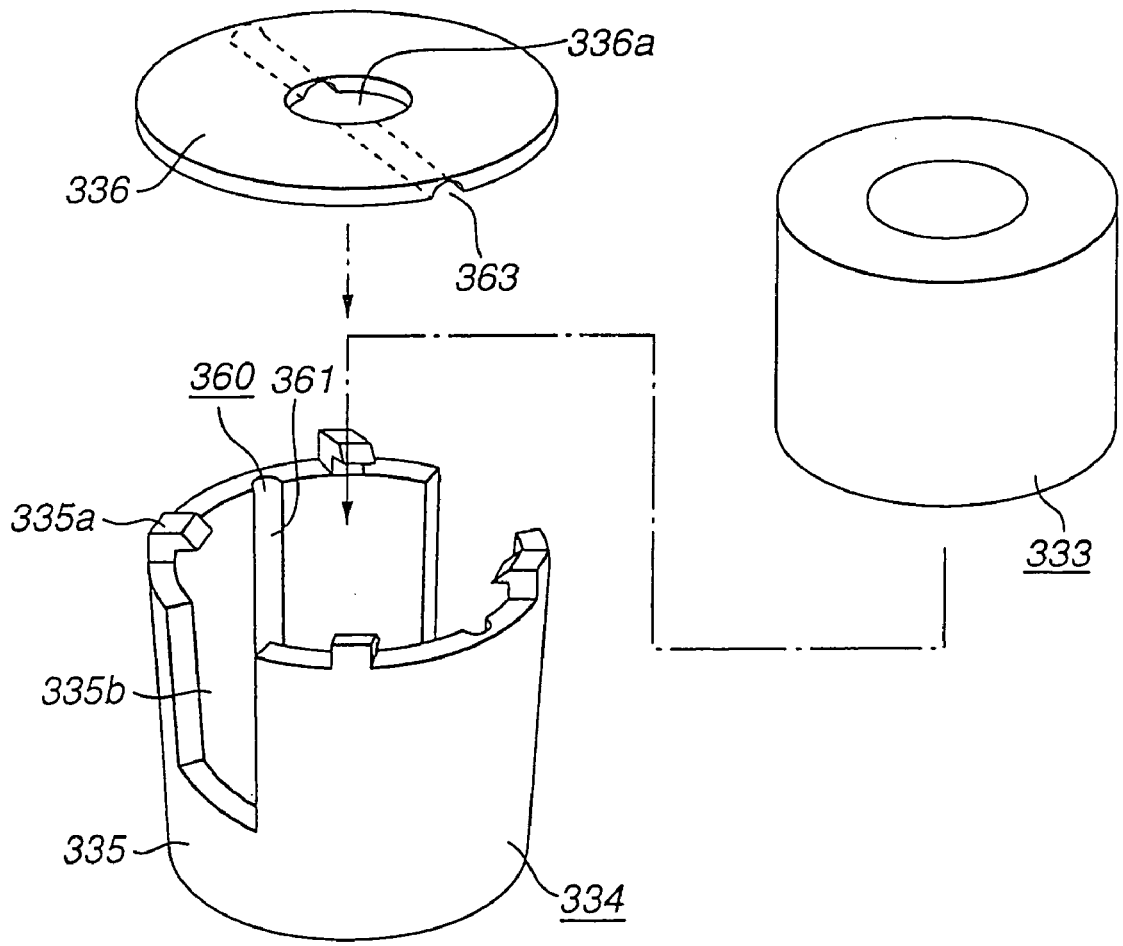
FIG. 23 is a schematic perspective view of another communication passage way that can be formed between the space-forming member and the radial bearing of a bearing unit according to the invention, showing the profile thereof.
Figure 24:
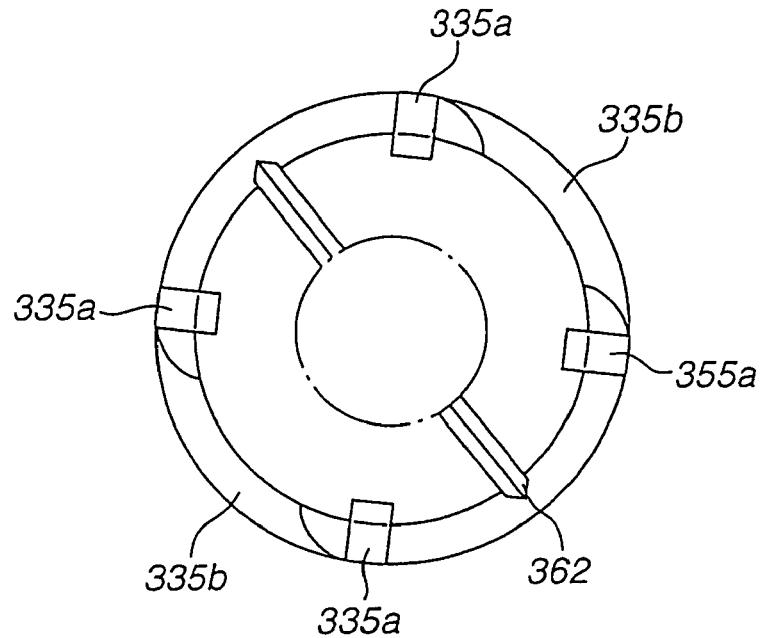
FIG. 24 is a schematic plan view of other second grooves that can be formed on the bottom surface side of the space-forming member so as to operate as communication passage way of a bearing unit according to the invention.
Figure 25:
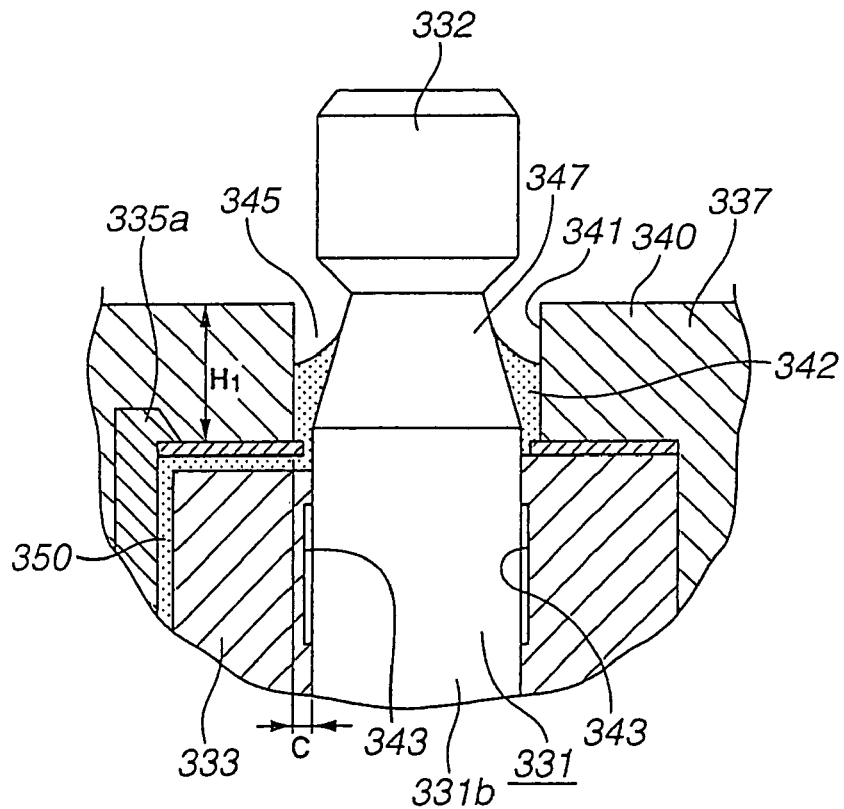
FIG. 25 is a schematic cross sectional view of the gap defined by the outer peripheral surface of the rotary shaft and inner peripheral surface of the shaft receiving hole formed through the housing of a bearing unit according to the invention.

The communication passage way may alternatively be arranged at the side of the space-forming member 334 as shown in FIGS. 23 and 24. More specifically, when the communication passage way 360 is arranged at the side of the space-forming member 334, it comprises a first groove 361 formed on the inner peripheral surface of the space-forming member main body 335 of the space-forming member 334 in the thrusting direction, a second groove 362 formed on the inner surface of the bottom section of the space-forming member main body 335 and a third groove 363 formed on the inner surface of the space-forming member lid section 336. Still alternatively, the first through third grooves 351 through 353 arranged at the radial bearing side and the first through third grooves 361 through 363 arranged on the space-forming member 334 may be combined.

As pointed out above, in the bearing unit 330 of this embodiment, the width of the dynamic pressure generating grooves 344 is made greater than that of the dynamic pressure generating grooves 343 and the dynamic pressure P344 at the closed side of the shaft is made greater than the dynamic pressure P343 at the open side of the shaft. While this arrangement can suppress the floating shaft phenomenon that is produced by the revolving shaft, the residual air can be expanded at the closed end of the shaft due to the reduction of the static pressure at this side to give rise to a phenomenon that expanded air forces out lubricating oil.

However, the communication passage way 350 or the communication passage way 360 prevents lubricating oil from being forced out by the air remaining in the housing and/or the air dissolved in the lubricating oil because the open side end of the rotary shaft 331 that is projecting from the radial bearing 333 and the closed side end of the shaft 331 communicate with each other so that the static pressure at the closed side end of the rotary shaft 331 does not fall. In other words, the communication passage ways 350, 360 can short circuit the pressurized air at the opposite ends of the dynamic pressure generating grooves 343, 344 arranged on the radial bearing 333 so that no pressure difference occurs and hence the floating shaft phenomenon does not appear.

As shown in FIG. 19, the housing 337 that contains the space-forming member 334 has a profile adapted to surround and contain the substantially cylindrical space-forming member 334. It is an integral member formed by molding synthetic resin.

Referring to FIG. 19, the housing 337 includes a hollow cylindrical housing main body 338, a bottom closure section 339 formed integrally with the housing main body 338 and adapted to close one of the opposite ends of the housing main body 338 and a top closure section 340 formed integrally with the housing main body 338 and adapted to close the other end of the housing main body 338. A shaft receiving hole 341 is bored through the center of the upper closure section 340 so as to allow the rotary shaft 331 that is housed in the housing 337 and rotatably supported by the radial bearing 333 to pass through it.

The housing 337 having the above described configuration is formed by outsert molding of a synthetic resin material to contain the cylindrical space-forming member 334 therein so that the space-forming member 334 is formed integrally with and arranged in the housing main body 338.

At this time, since the outer peripheral surface of the radial bearing 333 is partly exposed to the outside through the opening 335b of the space-forming member main body 335 so that the radial bearing 333 is also made integral with the housing 337 that is formed by outsert molding.

While the synthetic resin material of the housing 337 is not subjected to particular limitations, a material can provide a large contact angle relative to the lubricating oil 342 filled in the housing 337 so that it may repel the lubricating oil 342. Since the space-forming member 334 is integrally formed with the housing 337, the housing 337 is preferably made of a synthetic resin material that shows an excellent lubricating performance. Examples of synthetic resin materials that can preferably be used for the housing 337 include fluorine type synthetic resin materials such as polyimide, polyamide and polyacetal, although polytetrafluoroethylene Teflon (tradename), nylon, PC (polycarbonate), ABS (acrylonitrilbuta-dienestyrene) and other synthetic resin materials may also preferably be used. Alternatively, the housing 337 may be formed from a liquid crystal polymer that can be highly accurately molded. The housing 337 that is molded from a liquid crystal polymer is highly abrasion resistant and shows an excellent lubricating performance.

Meanwhile, the bearing unit 330 of this embodiment is a so-called shaft opposite ends open type bearing unit in which the opposite ends of the shaft 331, one of which is projecting from the radial bearing 333, communicate with each other by way of the communication passage way 350. Conventional shaft opposite ends open type bearing units are accompanied by the problem that lubricating oil can easily disperse when subjected to impact. However, in the bearing unit 330 of this embodiment, the housing 337 is made to be a seamless structure that is hermetically sealed except the shaft receiving through hole 336a and contains the radial bearing 333 and the space-forming member 334 in the inside so that, while the open side end of the shaft that projects from the radial bearing and the closed side end of the shaft are made to communicate with each other by way of the communication passage way 350, the bearing unit 330 is hermetically sealed and isolated from the outside except the shaft receiving hole 336a arranged at the housing 337. Differently stated, since the communication passage way 350 is arranged in the housing that is a seamless structure and hermetically sealed against the outside, lubricating oil is prevented from dispersing if it is subjected to impact.

The rotary shaft 331 that is rotatably supported by the thrust bearing 346, which is integral with the radial bearing 333 arranged in the inside of the housing 337 and the housing 337, has at an end thereof the bearing support section 331a of the shaft main body 331b that shows a curved or tapered profile and is adapted to be supported by the thrust bearing 346 and the fitting section 332 at the other end thereof, to which typically the rotor 331 of a motor 312, or a rotary body, is fitted. The fitting section 332 has a diameter same as that of the shaft main body 331b.

Referring to FIG. 19, the rotary shaft 331 is supported at the bearing support section 331a thereof located at an end thereof by the thrust bearing 346 and at the outer peripheral surface of the shaft main body 331b by the radial bearing 333, while it is supported at the fitting section 332 located at the opposite end thereof by the housing 337 with the shaft projecting through the shaft receiving hole 341 arranged at the top closure section 340 of the housing main body 338.

The rotary shaft 331 is provided with an anti-shaft-release groove 331c that is arranged between the bearing support section 331a and the shaft main body 331b. On the other hand, the space-forming member 334 is provided with a washer 349 that is arranged at a position corresponding to the anti-shaft-release groove 331c and adapted to operate as an anti-shaft-release means. Thus, the operation of assembling the bearing unit can be handled with ease as the anti-shaft-release groove 331c and the washer 349 are brought into mutual engagement. The washer 349 may typically be made of a polymeric material such as nylon, polyamide or polyimide or a metal material such as stainless steel or phosphor bronze.

Meanwhile, the shaft receiving hole 341 is formed to show an inner diameter slightly larger than the outer diameter of the shaft main body 331b so that the rotary shaft 331 that is made to run through the shaft receiving hole 341 revolves without touching the inner peripheral surface of the shaft receiving hole 341. The shaft receiving hole 341 is formed so as to provide a gap 345 with a gap dimension c that is sufficient for preventing the lubricating oil 342 filled in the housing 337 from leaking out of the housing 337 between the inner peripheral surface of the shaft receiving hole 341 and the outer peripheral surface of the shaft main body 331b. Thus, the top closure section 340, through which the shaft receiving hole 341 is formed to produce a gap 345 between the rotary shaft 331 and the shaft receiving hole 341 that prevents the lubricating oil 342 filled in the housing 337 from leaking, operates as oil seal section.

Since the top closure section 340 that is integrally formed with the housing 337 is made of synthetic resin such as polyimide, polyamide or nylon, it can secure a contact angle of about 60° for the inner peripheral surface of the shaft receiving hole 341 relative to lubricating oil 342. The bearing unit 330 of this embodiment can provide the top closure section 340 with a large contact angle relative to lubricating oil 342 without applying a surface active agent to the top closure section 340 that operates as oil seal section and includes the inner peripheral surface of the shaft receiving hole 341. Therefore, the bearing unit 330 can prevent lubricating oil 342 from being driven to the outside of the housing 337 through the shaft receiving hole 341 by the centrifugal force generated when the rotary shaft 331 is driven to revolve.

Additionally, the part of the outer peripheral surface of the rotary shaft 331 that is located vis-à-vis the inner peripheral surface of the shaft receiving hole 341 is provided with a tapered section 347. The tapered section 347 is so inclined that the gap 345 formed between the outer peripheral surface of the rotary shaft 331 and the inner peripheral surface of the shaft receiving hole 341 expands as it comes close to the outside of the housing 337. The tapered section 347 produces a pressure gradient in the gap 345 between the outer peripheral surface of the rotary shaft 331 and the inner peripheral surface of the shaft receiving hole 341 to generate force that tends to draw the lubricating oil 342 filled in the housing 337 toward the inside of the housing 337. Thus, the lubricating oil 342 tends to be drawn to the inside of the housing 337 when the rotary shaft 331 is driven to revolve so that lubricating oil 342 reliably gets into the dynamic pressure generating grooves 358 of the radial bearing 333 that operates as hydrodynamic fluid bearing to reliably support the rotary shaft 331 and prevent the lubricating oil 342 filled in the housing 337 from leaking.

In the bearing unit 330 of this embodiment, the lubricating oil 342, which gets into the dynamic pressure generating grooves 358 arranged on the radial bearing 333 that operates as hydrodynamic fluid bearing to generate dynamic pressure, is filled in the bearing unit 330 in such a way that that it appears from the inside of the housing 337 to the gap 345 formed between the tapered section 347 of the rotary shaft 331 and the inner peripheral surface of the shaft receiving hole 341. In other words, the lubricating oil 342 is filled in all the gaps in the housing 337 and impregnated into the radial bearing 333 that is made of sintered metal.

Now, the gap 345 formed between the tapered section 347 of the rotary shaft 331 and the inner peripheral surface of the shaft receiving hole 341 will be discussed below. The minimum dimension of the gap 345 corresponds to the distance c between the outer peripheral surface of the rotary shaft 331 and the inner peripheral surface of the shaft receiving hole 341 and the dimension c is preferably between 20 µm and 200 µm, more preferably about 100 µm. If the dimension c is smaller than 20 µm, it is difficult to secure the necessary molding accuracy when integrally molding the housing 337 of the bearing unit 330 from synthetic resin. If, on the other hand, the dimension c of the gap 345 is larger than 200 µm, the impact-resistance of the lubricating oil 342 filled in the housing 337 is reduced and lubricating oil can disperse to the outside of the housing 337 when the bearing unit 330 is subjected to impact.

The impact-resistance G of the lubricating oil 342 filled in the housing 337 that prevents lubricating oil from dispersing to the outside of the housing 337 when the bearing unit 330 is subjected to impact is expressed by formula (1) below;

$$G = (12\gamma \cos \beta / 2\rho c^2)/g \tag{1}$$

where $\gamma$: surface tension of lubricating oil, $\beta$: contact angle of lubricating oil, $\rho$: density of lubricating oil, c: dimension of the gap between the rotary shaft and the shaft receiving hole and g: free fall acceleration.

From the formula (1), it will be appreciated that the impact-resistance G is inversely proportional to a square of the dimension c of the gap 345.

The rise h of the oil surface due to thermal expansion is expressed by formula (2) below;

$$h = V\alpha\Delta t / 2\pi Rc \quad (2),$$

where V: volume of the filled lubricating oil,

α: thermal expansion coefficient,

Δt: temperature change and

R: shaft half diameter.

From the formula (2), it will be appreciated that the rise h of the oil surface is inversely proportional to the dimension c so that the impact-resistance G rises when the dimension c is reduced but the rise h of surface of the filled lubricating oil 342 due to a temperature rise is fierce so that the axial length, or the height, of the shaft receiving hole 341 needs to be increased to avoid problems.

As a result of an computing operation, it was found that the impact-resistance is not smaller than 1,000G in a bearing unit 330 having a rotary shaft 331 whose shaft diameter is between 2 mm and 3 mm when the dimension c of the gap 345 formed between the rotary shaft 331 and the shaft receiving hole 341 is about 100 μm, while the height H1 of the shaft receiving hole 341, or the thickness of the top closure section 340 of the housing 337, is about 1 mm. Then, the lubricating oil 342 can withstand a high temperature level of 80° C. and the bearing unit 330 can operate reliably so as to prevent the lubricating oil 342 filled in the housing 337 from dispersing.

Additionally, in the bearing unit 330 of this embodiment, the rotary shaft 331 is provided with a tapered section 347 that is adapted to increase the dimension c of the gap 345 formed between the outer peripheral surface of the rotary shaft 331 and the inner peripheral surface of the shaft receiving hole 341 toward the outside of the housing 337 so that a pressure gradient is formed in the gap 345 with the dimension c formed between the outer peripheral surface of the rotary shaft 331 and the inner peripheral surface of the shaft receiving hole 341 to draw the lubricating oil 342 filled in the housing 337 toward the inside of the housing 337 by the centrifugal force that is generated when the rotary shaft 331 is driven to revolve.

Thus, in the bearing unit 330 of this embodiment, the gap 345 formed between the outer peripheral surface of the rotary shaft 331 and the inner peripheral surface of the shaft receiving hole 341 prevents lubricating oil 342 from dispersing by effect of the surface tension seal produced there.

Figure 26:
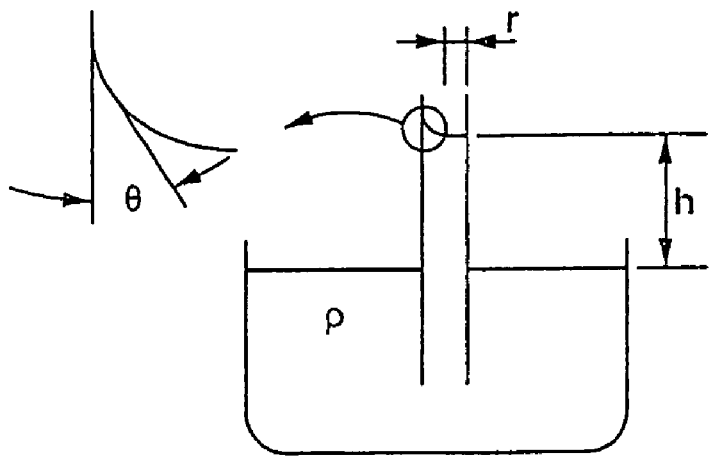
FIG. 26 is a schematic illustration of the capillary phenomenon of fluid.

Now, the surface tension seal will be described below. A surface tension seal represents a sealing technique that utilizes the capillary phenomenon of fluid. In the case of a capillary as shown in FIG. 26, the rise h of the surface level of the liquid is determined by formula (3) shown below;

$$2\pi r \gamma \cos\theta = mg \quad (3),$$

where m is expressed by formula (4) below;

$$m = \pi r^2 h \rho \quad (4),$$

where m: fluid mass within the range of h in the capillary, r: half diameter of the capillary, γ: surface tension of viscous fluid, θ: contact angle of viscous fluid, ρ: density of viscous fluid and g: gravity acceleration.

Formula (5) below is drawn from the formulas (3) and (4);

$$h = 2\gamma\cos\theta / r\rho g \quad (5).$$

Generally, the relationship between pressure P and the height of fluid is expressed by formula (6) below;

$$P = \rho g h \quad (6).$$

Thus, formula (7) below is obtained from the formulas (5) and (6);

$$P = 2\gamma\cos\theta / r \quad (7).$$

In the formula (7), pressure P refers to the pressure that draws fluid. From the formula (7), the drawing pressure is greater when the diameter of the capillary is smaller.

Figure 27:
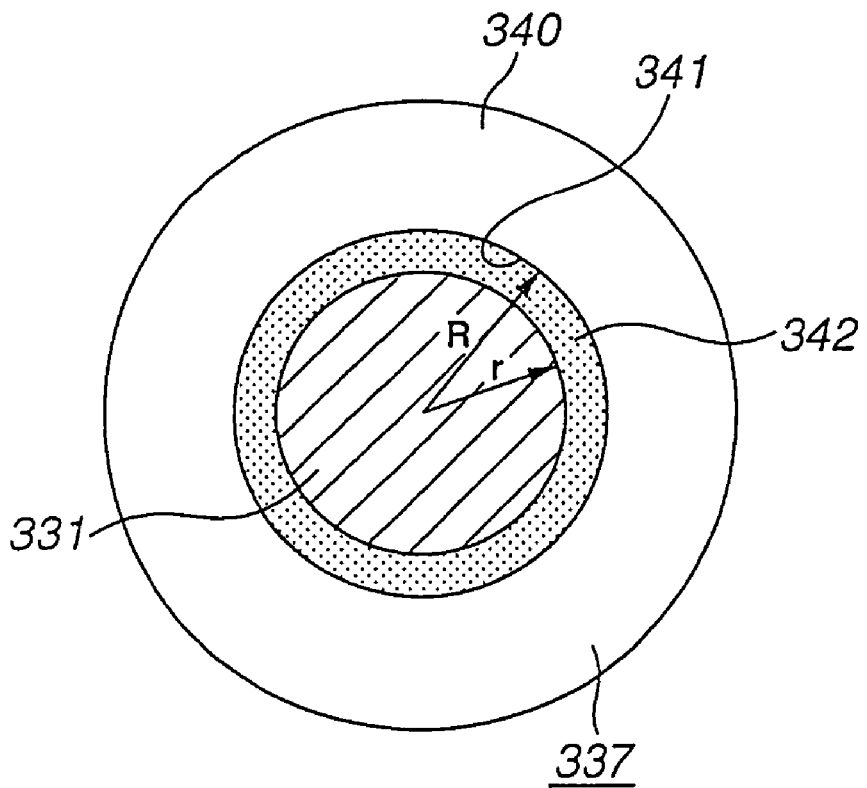
FIG. 27 is a schematic cross sectional view of the lubricating oil that has come into the gap formed between the outer peripheral surface of the rotary shaft and the inner peripheral surface of the shaft receiving hole of a bearing unit according to the invention.

While the above description is applied to a situation where the capillary shows a circular cross sectional view, the lubricating oil 342 that gets into the gap 345 formed between the outer peripheral surface of the rotary shaft 331 and the inner peripheral surface of the shaft receiving hole 341 of the bearing unit 330 of this embodiment shows an annular cross sectional view as shown in FIG. 27. In this case, the rise h1 of the surface level of liquid, which is lubricating oil 342, is determined by formula (8) below;

$$2\pi(R+r)\gamma\cos\theta = mg \quad (8),$$

where m is expressed by formula (9) below;

$$m = \pi(R^2 - r^2)h\rho \quad (9)$$

Thus, formula (10) below is obtained from the formulas (8) and (9);

$$h1 = (2\gamma\cos\theta)/((R-r)\rho g) \quad (10).$$

If (R·r) is equal to the dimension c of the gap 345 that is formed between the outer peripheral surface of the rotary shaft 331 and the inner peripheral surface of the shaft receiving hole 341, formula (11) is obtained by transcribing the formula (10);

$$h = (2\gamma\cos\theta)/(c\rho g) \quad (11).$$

Thus, when the lubricating oil 342 in the gap 345 shows an annular cross sectional view, the drawing pressure is expressed by formula (12) below;

$$P = 2\gamma\cos\theta/c \quad (12).$$

Now, a specific example of computing operation will be shown below.

If the dimension c of the gap 345 formed between the outer peripheral surface of the rotary shaft 331 and the inner peripheral surface of the shaft receiving hole 341 is 0.02 cm (0.2 mm), the surface tension γ of viscous fluid is 30 dyn/cm2 and the contact angle θ of lubricating oil 342 is 15°, the drawing pressure is 2.86×10·3 atm from the formula (13).

$$P = 2 \times 30 \times \cos 15° / 0.02 \quad (13)$$

$$= 3.00 \times 10^3 \text{ dyn/cm2}$$

$$= 2.86 \times 10 \cdot 3 \text{ atm.}$$

From the formula (12), it will be seen that the drawing pressure P is greater when the dimension c of the gap 345 is smaller. Thus, it will be seen that, when the rotary shaft 331 is provided with a tapered section 347, the lubricating oil 342, which is viscous fluid, is drawn toward the side where the dimension c of the gap 345 is smaller and hence toward the inside of the housing 337.

Figure 28:
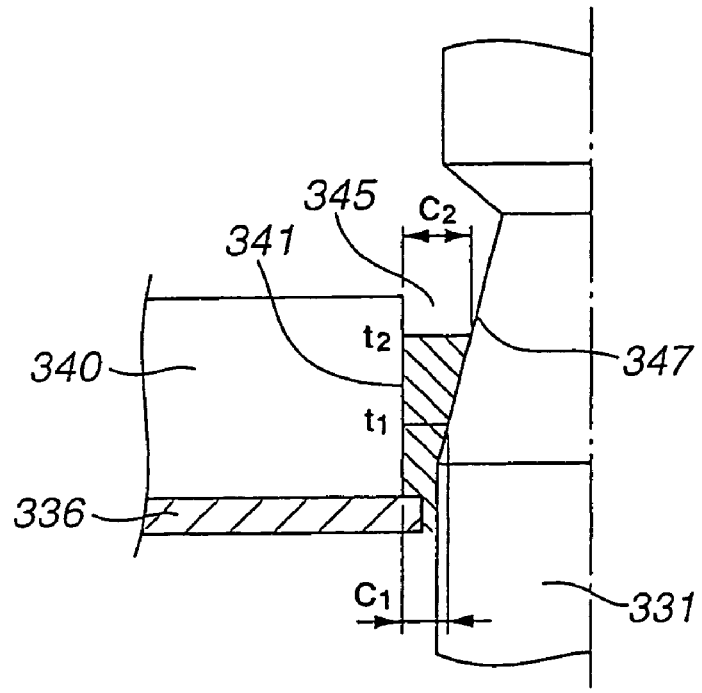
FIG. 28 is a schematic longitudinal cross sectional view of the gap formed between the outer peripheral surface of the rotary shaft and the inner peripheral surface of the shaft receiving hole of a bearing unit according to the invention, illustrating the pressure difference between parts of the tapered section of the rotary shaft having different diameters.
Figure 29:
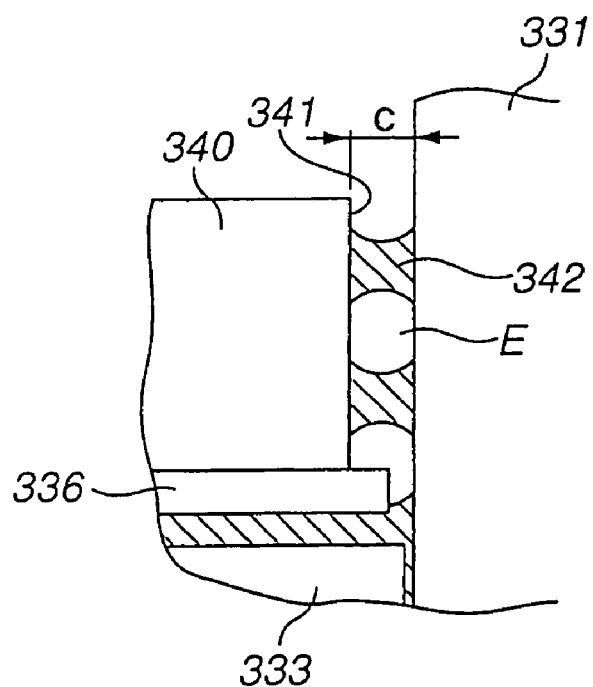
FIG. 29 is a schematic longitudinal cross sectional view of the gap formed between the outer peripheral surface of the rotary shaft and the inner peripheral surface of the shaft receiving hole of a bearing unit according to the invention, illustrating how air is drawn into the lubricating oil that has come into the gap.

For example, referring to FIG. 28, the drawing pressure P1 at position t1 and the drawing pressure P2 at position t2 of the tapered section 347 of the rotary shaft 331, the diameter at position t1 being different from the diameter at position t2, show a relationship of P1>P2 from the formula (12) because the dimension c1 of the gap between the outer peripheral surface of the rotary shaft 331 and the inner peripheral surface of the shaft receiving hole 341 and the dimension c2 of the gap between the outer peripheral surface of the rotary shaft 331 and the inner peripheral surface of the shaft receiving hole 341 have the relationship of c1<c2. Thus, it will be seen that the drawing pressure P trying to draw the lubricating oil 342 into the inside of the housing 337 is greater when the dimension c of the gap 345 formed between the outer peripheral surface of the rotary shaft 331 and the inner peripheral surface of the shaft receiving hole 341 is smaller.

As the rotary shaft 331 is provided with a tapered section 347 that makes the dimension c of the gap 345 formed between the outer peripheral surface of the rotary shaft 331 and the inner peripheral surface of the shaft receiving hole 341 decrease toward the inside of the housing 337 so as to form a seal section for preventing the lubricating oil 342 filled in the housing 337 from leaking to the outside of the housing 337, a pressure gradient is produced in the lubricating oil 342 that is found in the gap 345 formed between the outer peripheral surface of the rotary shaft 331 and the inner peripheral surface of the shaft receiving hole 341. Thus, the pressure gradient of the lubricating oil 342 is such that the pressure trying to draw the lubricating oil 342 into the inside of the housing 337 increases as a function of the dimension c of the gap 345. As a result of producing such a pressure gradient in the lubricating oil 342, the lubricating oil 342 is constantly subjected to pressure P trying to draw it into the inside of the housing 337 so that air is not drawn into the lubricating oil 342 in the gap 345 when the rotary shaft 331 is driven to revolve.

When the above described tapered section 347 is not provided, or when the dimension c of the gap 345 between the outer peripheral surface of the rotary shaft 331 and the inner peripheral surface of the shaft receiving hole 341 has a constant value along the longitudinal direction of the shaft receiving hole 341 as shown in FIG. 27, no pressure gradient is produced in the lubricating oil 342 that gets into the gap 345 between the outer peripheral surface of the rotary shaft 331 and the inner peripheral surface of the shaft receiving hole 341 so that lubricating oil 342 is found uniformly in the gap 345. Then, when the rotary shaft 331 is driven to revolve, the lubricating oil 342 that gets into the gap 345, which operates as seal section if its dimension c between the outer peripheral surface of the rotary shaft 331 and the inner peripheral surface of the shaft receiving hole 341 is decreased toward the inside of the housing 337, moves in the gap 345 so that it can draw air E into itself. As air E is drawn into the lubricating oil 342, the air E in the lubricating oil 342 expands when the temperature and/or the pressure change to make lubricating oil 342 disperse from the gap 345, which operates as seal section, to the outside of the housing 337.

To the contrary, in the bearing unit 330 of this embodiment, the rotary shaft 331 is provided with a tapered section 347 that decreases the dimension c of the gap 345 between the outer peripheral surface of the rotary shaft 331 and the inner peripheral surface of the shaft receiving hole 341 toward the inside of the housing 337 so that a pressure gradient is produced in the lubricating oil 342 that gets into the gap 345 that makes the pressure being applied to the lubricating oil 342 increase toward the inside of the housing 337. Therefore, air E is prevented from being drawn into the lubricating oil 342 when the rotary shaft 331 is driven to revolve.

As a result of providing a tapered section 347 in a manner as described above, the lubricating oil 342 that gets into the gap 345 formed between the outer peripheral surface of the rotary shaft 331 and the inner peripheral surface of the shaft receiving hole 341 is prevented from dispersing to the outside of the housing 337 when the rotary shaft 331 becomes eccentric relative to the shaft receiving hole 341 of the housing 337 and additionally, lubricating oil 342 is allowed to get into the gap 345 around the entire periphery of the rotary shaft 331 to prevent the rotary shaft 331 from being short of lubricating oil 342 and guarantee that the rotary shaft 331 revolves stably.

Figure 30:
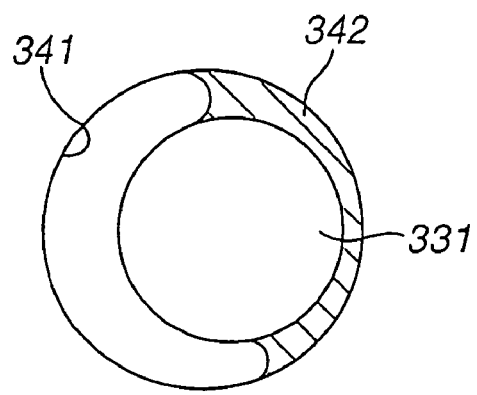
FIG. 30 is a schematic transversal cross sectional view of the gap formed between the outer peripheral surface of the rotary shaft and the inner peripheral surface of the shaft receiving hole of a bearing unit according to the invention, illustrating that the lubricating oil that has come into the gap is cut apart.

If the rotary shaft 331 is not provided with a tapered section 347 in a manner as described above and the rotary shaft 331 becomes eccentric relative to the shaft receiving hole 341 of the housing 337, lubricating oil 342 is concentrated to an area where the dimension c of the gap between the outer peripheral surface of the rotary shaft 331 and the inner peripheral surface of the shaft receiving hole 341 is small, while lubricating oil 342 becomes scarce in the remaining area where the dimension c is large so that it draws air E into itself as shown in FIG. 30. As air E is drawn into the lubricating oil 342, the air E in the lubricating oil 342 expands when the temperature and/or the pressure change to make lubricating oil 342 disperse from the gap 345, which operates as seal section, to the outside of the housing 337.

Figure 31:
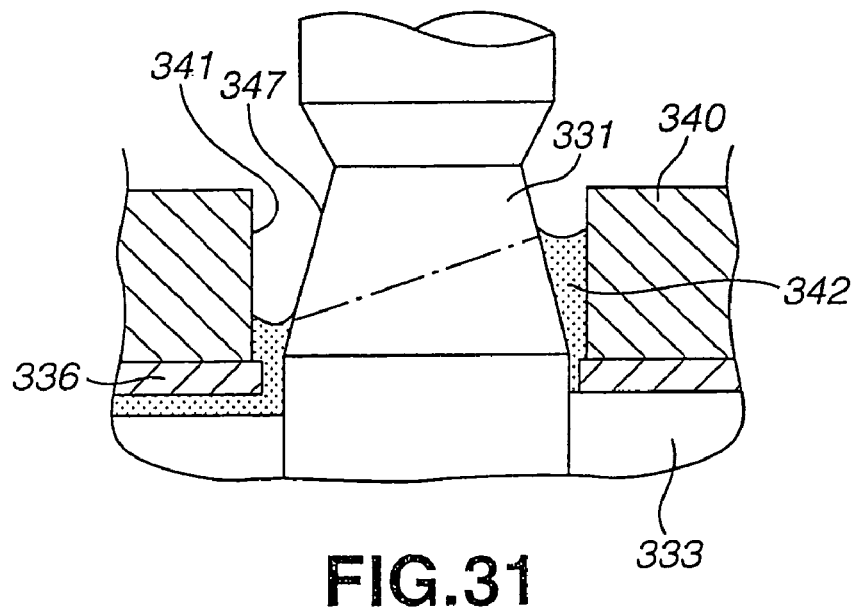
FIG. 31 is a schematic longitudinal cross sectional view of the rotary shaft received in the shaft receiving hole of the housing of a bearing unit according to the invention, showing that the rotary shaft is eccentric relative to the shaft receiving hole.
Figure 32:
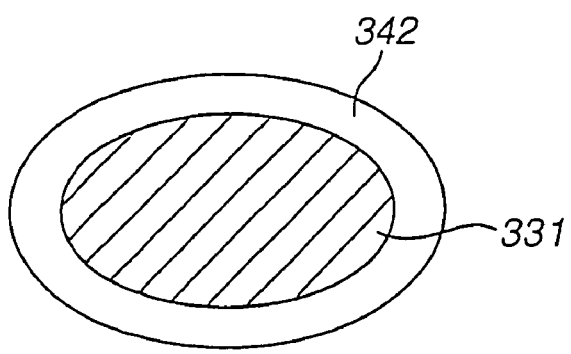
FIG. 32 is a schematic cross sectional view of the rotary shaft received in the shaft receiving hole of the housing of a bearing unit according to the invention, showing the lubricating oil that has come into the gap between them when the rotary shaft is eccentric relative to the shaft receiving hole.

To the contrary, the rotary shaft 331 of the bearing unit 330 of this embodiment is provided with a tapered section 347 so that, if the rotary shaft 331 becomes eccentric relative to the shaft receiving hole 341 of the housing 337, the elliptic trajectory of the eccentric rotary shaft 331 always show areas with a same dimension c of the gap 345 as shown in FIG. 31. Then, the dimension c of the gap 345 formed between the outer peripheral surface of the rotary shaft 331 and the inner peripheral surface of the shaft receiving hole 341 on the elliptic trajectory shows a constant value along all the circumference of the rotary shaft 331 as shown in FIG. 32 so that lubricating oil 342 would not be concentrated to an area where the dimension c is small. Thus, lubricating oil 342 is prevented from dispersing from the gap 345 and hence from the inside of the housing 337.

Figure 33:
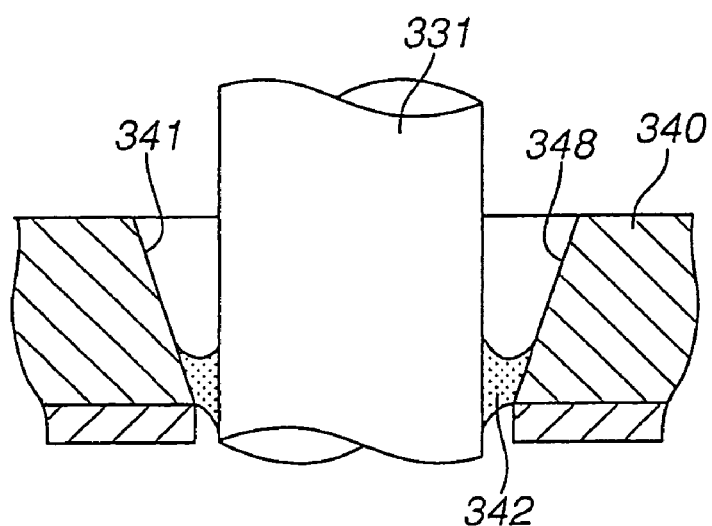
FIG. 33 is a schematic cross sectional view of the third embodiment of bearing unit according to the invention, in which the shaft receiving hole of the housing is tapered.

While the rotary shaft 331 is provided with a tapered section 347 in the above described bearing unit 330, alternatively the shaft receiving hole 341 of the housing 337 may be provided with a tapered section 348 on the inner peripheral surface thereof as shown in FIG. 33.

Now, a process of manufacturing a bearing unit 330 according to the invention and having the above described configuration will be described below.

Figure 34:
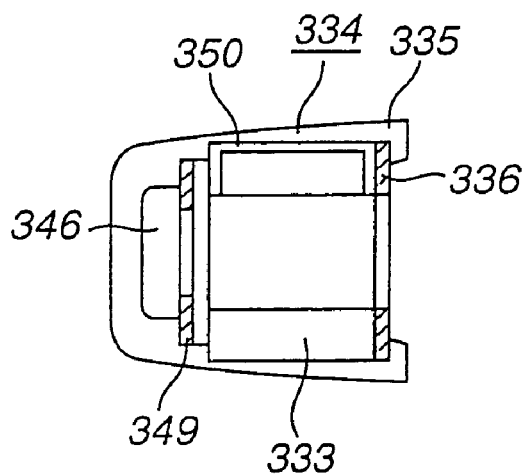
FIG. 34 is a schematic illustration of the temporary assembling step in the process of manufacturing a bearing unit according to the invention illustrated in FIG. 19.

When manufacturing a bearing unit 330 according to the invention, it is temporarily assembled by fitting a space-forming member 334 to the outside of a radial bearing 333. In this step of temporarily assembling a radial bearing 333 and a space-forming member 334, a washer 349, which is an anti-shaft-release means to be inserted into the anti-shaft-release groove 331c formed between the bearing support section 331a and the shaft main body 331b of the rotary shaft 331, is fitted to the space-forming member main body 335 as shown in FIG. 34. Then, the space-forming member main body 335 and the space-forming member lid section 336 are fitted to the radial bearing 333, which is a hydrodynamic fluid bearing. Note that a thrust bearing 346 is integrally formed with the space-forming member main body 335 in the inside of the latter. Additionally, a communication passage way 350 is formed between the space-forming member 334 and the radial bearing 333.

Figure 35:
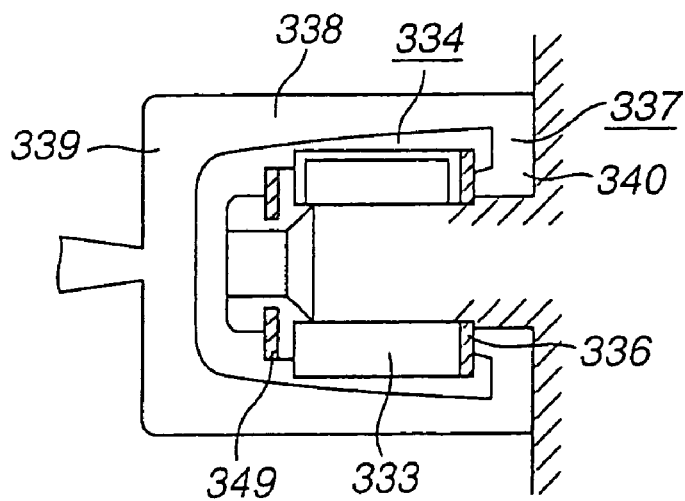
FIG. 35 is a schematic illustration of the step of outsert molding the housing in the process of manufacturing a bearing unit according to the invention.

Then, the radial bearing 333 and the space-forming member 334 that are temporarily assembled are fitted to a metal mold and a housing 337 is formed around the outer periphery of the temporarily assembled radial bearing 333 and the space-forming member 334 by outsert molding of a synthetic resin material selected from the materials listed earlier as shown in FIG. 35. When the housing 337 is formed by outsert molding, the space-forming member 334 is integrally arranged in the inside of the housing 337 and pinched between the top closure section 340 and the bottom closure section 339 that are formed integrally with the cylindrical housing main body 338 so that its position is secured. Additionally, when the housing 337 is formed by outsert molding, the radial bearing 333 is integrally formed with the housing 337 by the opening 335b of the space-forming member 334 and pinched between the top closure section 340 and the bottom closure section 339 that are formed integrally with the cylindrical housing main body 338 so that its position is secured. Since the communication passage way 350 between the space-forming member 334 and the radial bearing 333 is closed by the space-forming member 334 when the housing 337 is formed by outsert molding so that synthetic resin would not flow into it.

Figure 36:
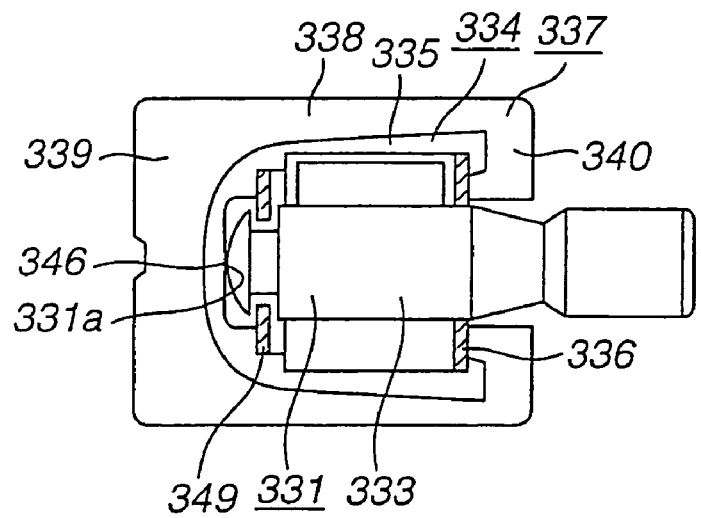
FIG. 36 is a schematic illustration of the step of inserting the rotary shaft into the housing in the process of manufacturing a bearing unit according to the invention.

Then, the rotary shaft 331 is driven into the housing 337 through the shaft receiving hole 341 arranged in the top closure section 340 as shown in FIG. 36. At this time, the washer 349 that is an anti-shaft-release means is forcibly inserted into the anti-shaft-release groove 331c by elastic deformation and the rotary shaft 331 is driven into the housing 337 through the radial bearing 333 until the bearing support section 331a abuts the thrust bearing 346. Thus, the rotary shaft 331 is rotatably supported by the thrust bearing 346 and the radial bearing 333 in the housing 337.

Figure 37:
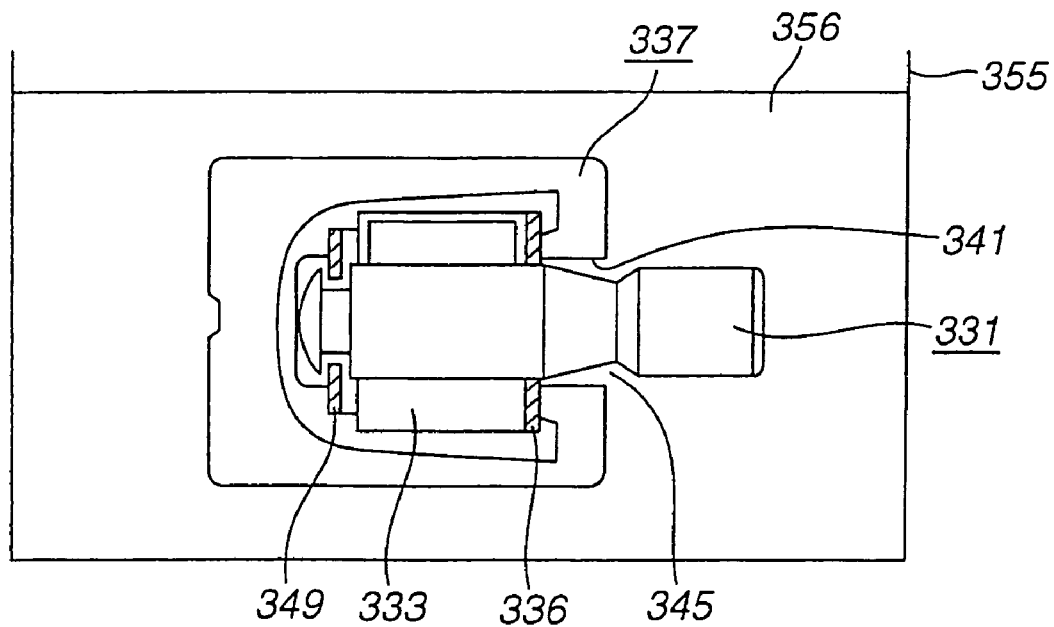
FIG. 37 is a schematic illustration of the step of filling lubricating oil in the process of manufacturing a bearing unit according to the invention.

After the rotary shaft 331 is driven into the housing 337, the housing 337 is filled with lubricating oil 342. When filling the housing 337 with lubricating oil 342, the housing 337, in which the rotary shaft 331 is arranged, is put into a filling tank 355 that contains lubricating oil 356 as shown in FIG. 37. Then, the filling tank 355 now containing the housing is subjected to vacuum suctioning, using a vacuum device. The housing 337 is filled with lubricating oil 342 as the filling tank that is subjected to vacuum suctioning is taken out into the atmosphere.

At this time, the housing 337 is filled with lubricating oil 342 in such a way that, lubricating oil 342 is prevented from leaking to the outside of the housing 337 through the shaft receiving hole 341 when it is expanded by a temperature change and the gap 345 formed between the rotary shaft 331 and the shaft receiving hole 341 is free from an insufficiently filled condition when the lubricating oil 342 there is contracted by a temperature change. In short, the surface level of the lubricating oil 342 in the gap 345 is made to be always found within the shaft receiving hole 341 regardless of temperature changes.

Because an operation of vacuum suctioning is carried out by using a vacuum device for filling the housing 337 with the lubricating oil 342, the pressure in the inside of the housing 337 is lower than that of the outside of the housing. As a result, the lubricating oil 342 is prevented from leaking to the outside of the housing 337.

In the bearing unit 330 of this embodiment, because the radial bearing 333 is made of sintered metal, the radial bearing 333 is filled with lubricating oil 342 and the dynamic pressure generating grooves 358 that is adapted to generate dynamic pressure when the rotary shaft 331 is driven to revolve is also filled with lubricating oil 342. In short, all the spaces in the housing 337 are filled with lubricating oil 342.

While the housing of the above described bearing unit is formed by molding, using synthetic resin, the material of the housing is not limited to synthetic resin. For example, the housing may alternatively be formed by molding a mixture of a moldable metal material and a synthetic resin material or some other molding material that can be molded by means of a metal mold. However, it should be noted that, when the housing is formed by using a material other than synthetic resin, there may be a risk that the contact angle of the lubricating oil filled in the housing relative to the inner peripheral surface of the shaft receiving hole becomes insufficient. The risk that the contact angle of lubricating oil becomes insufficient can be avoided by applying a surface active agent to the inner peripheral surface of the shaft receiving hole or to the entire outer peripheral surface of the top closure section including the inner peripheral surface of the shaft receiving hole.

While the thrust bearing is formed as part of the housing in the above described bearing unit, a bottom closure section that is provided with a thrust bearing may be formed separately from the housing main body and the bottom closure section and the housing main body may be bonded together by means of an appropriate technique such as heat seal or ultrasonic seal.

A bearing unit 330 having the above described configuration dissolves the problem of a so-called shaft opposite ends open type bearing unit having a seamless resin-made housing that is very effective for preventing lubricating oil leakage but accompanied by a drawback that lubricating oil is apt to be pushed out when the shaft is driven to revolve and simultaneously the residual air and the air dissolved in the lubricating oil expand (cavitation phenomenon).

While the housing of a conventional bearing unit of the type under consideration is formed by a plurality of components and the passage way provided to short circuit the pressurized air at the opposite ends of the radial bearing follows a route of the closed side of the shaft—passage way—outside of the housing—the open side of the shaft, the corresponding passage way of a bearing unit according to the invention is made to follow a route of the closed side of the shaft—communication passage way—the open side of the shaft and the space-forming member 334 in which the communication passage way is formed is surrounded and covered by a seamless housing 337.

Thus, the bearing unit 330 is provided with a space-forming member 334 and a communication passage way 350 running by the upper end and the lower end of the radial bearing 333 so as to follow a route connecting the bearing lower end—passage way—bearing upper end in order to alleviate any reduction in the static pressure at the closed side, or the lower end of the closed side. Therefore, it is possible to prevent leakage of lubricating oil that can be caused by the residual air trying to push up lubricating oil. Additionally, since the gap between the rotary shaft and the housing is the sole path connecting the inside and the outside of the housing, it is possible to prevent lubricating oil from dispersing if it is subjected to impact. In other words, it is possible to prevent the viscous fluid from oozing out. As a result, the bearing unit 330 can maintain its excellent lubricating performance for a long period of time.

Figure 38:
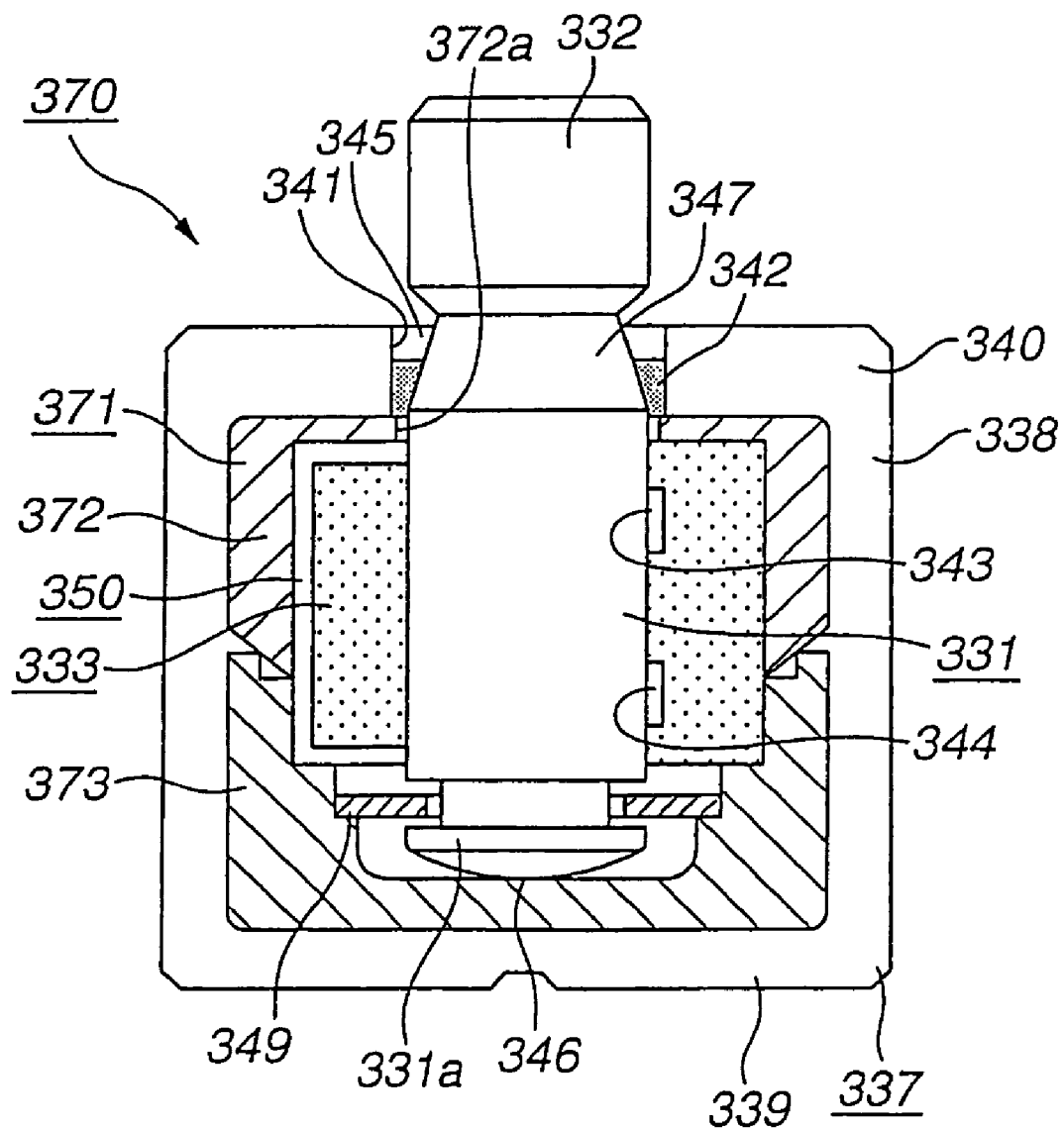
FIG. 38 is a schematic cross sectional view of still another embodiment of bearing unit according to the invention.

The space-forming member of a bearing unit according to the invention may alternatively have a configuration as shown in FIG. 38. In the following description, the components of the bearing unit that are same as or similar to their counterparts of the bearing unit 330 of FIG. 19 are denoted respectively by the same reference symbols and will not be described in detail.

The bearing unit 370 of FIG. 38 differs from the bearing unit 330 of FIG. 19 in terms of the configuration of space-forming member. In the bearing unit 370, the space-forming member 371 includes a first space-forming member 372 formed to surround an upper part of the lateral section and the top section of the radial bearing 333 and a second space-forming member 373 formed to surround a lower part of the lateral section and the bottom section of the radial bearing 333. The first space-forming member 372 is provided at the center thereof with a shaft receiving hole 372a, through which a rotary shaft 331 is driven into the housing so as to be rotatably supported by the radial bearing 333.

The second space-forming member 373 is provided at the center of the inner surface of the bottom section thereof with a thrust bearing 346 for rotatably supporting the bearing support section 331a of the rotary shaft 331, which is arranged at an end of the rotary shaft 331 in the thrusting direction. The thrust bearing is integrally formed by molding with the space-forming member 371, which is made of resin. The thrust bearing 346 is formed as a pivot bearing that supports the bearing support section 331a having a curved or tapered profile of the rotary shaft 331 at a single point.

A communication passage way is formed between the space-forming member 371 and the radial bearing 333 as in the case of the bearing unit 330. The communication passage way operates to make the opposite ends of the thrust bearing of the rotary shaft 331, which projects from the radial bearing 333, communicate with each other. In other words, the communication passage way 350 makes one end of the shaft, which is the closed end where the thrust bearing 346 is formed, and the other end of the shaft, which is the open end located close to the shaft receiving hole 372a of the first space-forming member 372, communicate with each other.

Like the bearing unit 330, the bearing unit 370 is provided with a space-forming member and a communication passage way running by the upper end and the lower end of the radial bearing 333 so as to follow a route connecting the bearing lower end—passage way—bearing upper end in order to alleviate any reduction in the static pressure at the closed side, or the lower end of the closed side. Therefore, it is possible to prevent leakage of lubricating oil that can be caused by the residual air trying to push up lubricating oil. Additionally, since the gap between the rotary shaft and the housing is the sole path connecting the inside and the outside of the housing, it is possible to prevent lubricating oil from dispersing if it is subjected to impact. In other words, it is possible to prevent the viscous fluid from oozing out. As a result, the bearing unit 370 can maintain its excellent lubricating performance for a long period of time.

In a bearing unit according to the invention, the space-forming member may have any configuration so long as resin does not flow into the communication passage way that is formed between the space-forming member and the radial bearing when the housing member is formed by outerset molding. Otherwise, the configuration of the space-forming member is not subjected to any limitations.

A bearing unit according to the invention as described above is adapted to use lubricating oil as viscous fluid to be filled in the housing. However, viscous fluid of any other type may alternatively be selected and used for the purpose of the invention so long as it shows viscosity and surface tension to a predetermined extent.

The present invention is by no means limited to the above-described embodiments, which may be modified and altered in various different ways that are apparent to those who are skilled in the art without departing from the scope of the invention.

INDUSTRIAL APPLICABILITY

As described above, according to the invention, there is provided a bearing unit that is compact and highly reliable and can enjoy a long service life because it is free from both the problem of a slipping out shaft at the time of assembling and the problem of leakage of lubricating oil.

While a bearing unit according to the invention is highly reliable and can enjoy a long service life because it is free from the problem of leakage of lubricating oil, it is not accompanied by a drawback of remarkable complexity in terms of device configuration and manufacturing process.

Additionally, a bearing unit according to the invention is made to comprise an anti-shaft-release member and a member for securing a necessary space around the anti-shaft-release member in order to prevent the rotary shaft from slipping away due to impact or a change in the atmospheric pressure and/or the inner pressure.

Still additionally, the housing member of a bearing unit according to the invention is made of a polymeric material so as to hold the remaining members including a seal member from outside without any gap in order to prevent lubricating oil from leaking.

Still additionally, a hydrodynamic fluid bearing is used as radial bearing means of a bearing unit according to the invention so that the rotary shaft can be supported highly accurately and the bearing unit is free from problems caused by leakage of lubricating oil, while the thrust bearing means has a simple configuration, to a great advantage of reducing the number of components, the manufacturing steps and hence the manufacturing cost.

Still additionally, in a bearing unit according to the invention, the drawing pressure is made greater in the inside of the gap surrounding the rotary shaft so that lubricating oil can hardly leak out from the gap and the lubricating oil in the gap is made free from a biased distribution caused when the rotary shaft becomes eccentric to consequently improve the reliability of the bearing unit.

Furthermore, a bearing unit according to the invention can effectively reduce vibrations and the configuration of the thrust bearing means is simplified because of the use of an anti-shaft-release member and a member for securing a necessary space around the anti-shaft-release member.

Finally, a bearing unit according to the invention can find applications as bearing in the field of motors of heat-emitting devices, spindle motors of disc drives and other motors. It can be used in a mechanism for supporting a rotary shaft or a mechanism for supporting a part that revolves relative to a shaft.

The invention claimed is:

1. A bearing unit comprising:
   a shaft extending in an axial direction through a gap in a holding member;
   an anti-shaft-release member adapted to inhibit movement of said shaft along said axial direction;
   a space-forming member along said axial direction between a base of the holding member and said anti-shaft-release member, said anti-shaft-release member along said axial direction being between a distal end of said shaft and said space-forming member;
   a radial bearing between said shaft and a sidewall of the holding member, said radial bearing being hermetically sealed within said base and said sidewall of the holding member.

2. The bearing unit according to claim 1, wherein a hydrodynamic fluid bearing is used as said radial bearing.

3. The bearing unit according to claim 1, wherein said shaft is radially revolvable within said radial bearing.

4. The bearing unit according to claim 1, wherein a diameter of said shaft within said gap has a taper, said taper within the gap increasing toward said radial bearing.

5. The bearing unit according to claim 1, wherein said holding member is made of synthetic resin.

6. The bearing unit according to claim 1, wherein said holding member is made of a polymeric material.

7. The bearing unit according to claim 1, wherein said sidewall is seamless with a seal portion and said base.

8. The bearing unit according to claim 1, wherein said anti-shaft-release member is attached to said distal end.

9. The bearing unit according to claim 1, wherein said space-forming member contacts said radial bearing.

10. A rotary drive comprising:
    the bearing unit according to claim 1; and
    a rotary body, the shaft being adapted to revolve with said rotary body.

11. The bearing unit according to claim 1, wherein a lubricating oil within said gap comes into contact with a seal portion of the holding member and said shaft.

12. The bearing unit according to claim 1, wherein said holding member is seamless between said sidewall and said base.

13. The bearing unit according to claim 1, wherein a diameter of said shaft at said distal end has a taper, said taper at the distal end decreasing toward said anti-shaft-release member.

14. The bearing unit according to claim 1, wherein dynamic pressure generating grooves are on a surface of said anti-shaft-release member.

15. The bearing unit according to claim 14, wherein said dynamic pressure generating grooves extend into said radial bearing.

16. The bearing unit according to claim 14, wherein said dynamic pressure generating grooves extend into said space-forming member.

17. The bearing unit according to claim 14, wherein said dynamic pressure generating grooves are on opposite surfaces of said anti-shaft-release member.

* * * * *